United States Patent [19]

Kagami

[11] Patent Number: 4,623,975

[45] Date of Patent: Nov. 18, 1986

[54] METHOD AND APPARATUS FOR DETECTING THE PROFILE AND FEEDING STATE OF PAPER SHEETS

[75] Inventor: Tomio Kagami, Kawasaki, Japan

[73] Assignee: Tokyo Shibaura Denki Kabushiki Kaisha, Kawasaki, Japan

[21] Appl. No.: 442,413

[22] Filed: Nov. 17, 1982

[30] Foreign Application Priority Data

| | | | |
|---|---|---|---|
| Nov. 20, 1981 | [JP] | Japan | 56-185250 |
| Nov. 20, 1981 | [JP] | Japan | 56-185251 |
| Nov. 20, 1981 | [JP] | Japan | 56-185252 |
| Aug. 13, 1982 | [JP] | Japan | 57-139762 |
| Aug. 23, 1982 | [JP] | Japan | 57-144852 |
| Aug. 23, 1982 | [JP] | Japan | 57-144853 |

[51] Int. Cl.[4] .......... G01B 11/04; G06F 15/36

[52] U.S. Cl. .......... 364/560; 209/534; 250/560; 356/387

[58] Field of Search .......... 382/7, 51, 52; 209/534; 364/560, 561, 562, 563; 194/4 R, 4 E, 4 F; 250/560, 561; 235/419, 454, 487, 474; 271/261, 263; 356/71, 380, 387

[56] References Cited

U.S. PATENT DOCUMENTS

| | | | |
|---|---|---|---|
| 4,041,456 | 8/1977 | Ott et al. | 209/534 |
| 4,173,788 | 11/1979 | Laliotis | 364/560 |
| 4,179,685 | 12/1979 | O'Maley | 382/7 |
| 4,201,378 | 5/1980 | Hams | 271/261 |
| 4,277,176 | 7/1981 | Grosvernier | 250/561 |
| 4,288,781 | 9/1981 | Sellner et al. | 382/7 |
| 4,298,807 | 11/1981 | Faure | 356/71 |
| 4,311,914 | 1/1982 | Huber | 382/7 |
| 4,429,991 | 2/1984 | Williams | 356/71 |
| 4,435,834 | 3/1984 | Pauli et al. | 382/7 |
| 4,464,786 | 8/1984 | Nishito et al. | 382/7 |
| 4,464,787 | 8/1984 | Fish et al. | 382/7 |

*Primary Examiner*—Felix D. Gruber
*Attorney, Agent, or Firm*—Cushman, Darby & Cushman

[57] ABSTRACT

At least one sheet of paper is conveyed in a feeding direction along a conveyance path. A line perpendicular to the feeding direction of the conveyed sheet includes at least first and second distinct view field regions (lengths) separated from one another by the center of the path. The light directed toward the sheet which passes across the path along the perpendicular line is optically scanned, and a value of the dimension a conveyed sheet projects into each of the first and second view field regions is produced for each scan. The sheet is repetitively scanned a plurality of times as it is conveyed along the path, and the values obtained, for each scan, for at least for the first and second regions are summed with a predetermined constant value to produce a sequence of width values representing the widths of the conveyed paper sheet at a corresponding plurality of longitudinal positions along the sheet. The width values from the sequence which fall within a range about a predetermined nominal width value of the sheet (the range being this nominal width value plus or minus a preset allowable deviation) are selected and used for computing the average width value of the sheet. The average width value is compared with a reference width value. Document skew, dog-ear, puncture and other parameters may also be determined from the measured width values.

31 Claims, 35 Drawing Figures

MISALIGNMENT FEEDING

WHEN SHEET-DIMENSION IS SMALL
DEGREE OF BENDING ℓ

WHEN SHEET-DIMENSION IS LARGE ℓ>ℓ'

METHOD AND APPARATUS FOR DETECTING THE PROFILE AND FEEDING STATE OF PAPER SHEETS

BACKGROUND OF THE INVENTION

The present invention relates to a profile and feeding state detection apparatus and method for a paper sheet to be fed into an inspection apparatus for determining the condition and authenticity (i.e., counterfeit nature) of a paper sheet such as a banknote and, more particularly, to a detection apparatus and method for detecting the width, damage, skew, misalignment, puncture, or dog ear of the paper sheet.

A conventional profile and feeding state detection apparatus of the type described above has a configuration as shown in FIG. 1. A light source 1 directs light onto the lower surface of a paper sheet P which is fed in the feeding direction indicated by arrow a. Rod-shaped photocells 3 and 5 are disposed above the paper sheet P and oppose the light source 1 through the paper sheet P. The beams of light from the light source 1 which are transmitted through the paper sheet P are incident on the photocells 3 and 5. Output signals from the photocells 3 and 5 are amplified by amplifiers 7 and 9 respectively. The amplified signals are then supplied to a processing circuit 11. The photocells 3 and 5 are disposed at the two edges (width-wise) of the paper sheet P in the direction perpendicular to the feeding direction indicated by arrow a. When the paper sheet P is fed below the photocells 3 and 5, the light beams to be incident on the photocells 3 and 5 are shielded in accordance with the width (direction perpendicular to the feeding direction indicated by arrow a), damage, punctures, dog ears, etc. of the paper sheet P. At this time, the output signals from the photocells 3 and 5 are supplied to and amplified by the amplifiers 7 and 9 respectively. The amplified signals are then supplied to the processing circuit 11. In the processing circuit 11, each amplified signal is integrated for a predetermined time interval. Integrated values are used to detect the width and any damage, misalignment, or puncture of the paper sheet P.

In the conventional detection apparatus for detecting the width, damage, misalignment and puncture of the paper sheet P, when a dog ear is present in the paper sheet P or when the paper sheet P is damaged, output signals from the photocells 3 and 5 are greatly changed. As a result, a large error occurs in the integrated value of the output signal. For example, the integrated value may appear to indicate that the width of the paper sheet P is decreased. The detection apparatus then erroneously less than it should be that the paper sheet P has a width smaller than its actual width. In this condition, proper width and misalignment detection cannot be performed.

Similarly, the above integrated value may appear to indicate that the paper sheet P is damaged. Furthermore, the value may appear to indicate that a puncture (hole) is present in the paper sheet P. In this manner, even if the paper sheet P is neither damaged nor punctured, the detection apparatus erroneously detects that a damaged portion or a puncture is present which can result in greater inconvenience. Furthermore, proper detection cannot be performed when the paper sheet P such as a banknote is very thin, or when an old and worn banknote is used. For example, when a new banknote is used, the amount of light transmitted through the banknote is greater than that transmitted through an old, worn banknote. Therefore, the integrated value obtained by detecting the new banknote appears to indicate that its width is decreased in the same manner as in instances where the detection apparatus erroneously detects that the paper sheet has a damaged portion or a puncture. As a result, the detection apparatus erroneously detects that the new banknote has a width shorter than the standard width (or the detection apparatus erroneously detects that the new banknote has a damaged portion or a puncture). However, when an old banknote is used, the amount of light transmitted therethrough is smaller than that transmitted through a new banknote. The integrated value obtained by detecting the old banknote appears to indicate that its width is greater than it actually is (or the detecting apparatus erroneously detects that the old banknote does not have any damaged portion or puncture). The old banknote can be detected to have a width greater than the standard width, or to have no damaged portion or puncture, even if the old banknote has many damaged portions or punctures.

Another conventional skew detection apparatus is shown in FIG. 2. A pair of photosensors 13 and 15 are disposed in the direction perpendicular to the feeding direction indicated by arrow a and are spaced apart from one another. Skew detection is performed such that a time interval $T_{sk}$ (sec) from the moment when one corner of the leading edge of the paper sheet P passes the first one of the photosensors 13 and 15 to the moment when the other corner of the leading edge of the paper sheet P passes the second one of the photosensors 13 and 15 is measured using a unit time interval $T_{cp}$ (sec/m). Using the measured time interval $T_{sk}$ (sec), a distance $L_A$ (m) of the skewed paper sheet P is calculated from equation (I). Furthermore, using the obtained distance $L_A$ (m) and a distance $L_B$ (m) between the photosensors 13 and 15, a skew angle $\theta$ is calculated from equation (II) below:

$$L_A = T_{sk}/T_{cp} \quad \text{(I)}$$

$$\theta = \tan^{-1}(L_A/L_B) \quad \text{(II)}$$

However, in the conventional skew detection apparatus described above, when the paper sheet P has a dog ear (B in FIG. 3) or a damaged corner, a large error occurs in the measured value. Therefore, highly precise and accurate skew measurement cannot be performed.

FIG. 4 shows a conventional dog ear detection apparatus. Light sources 17 and 19 radiate light beams from above the paper sheet P fed in the feeding direction indicated by arrow a. Photocells 21 and 23 respectively oppose the light sources 17 and 19 and sandwich the paper sheet P. The photocells 21 and 23 receive light beams from the light sources 17 and 19, respectively. Output signals from the photocells 21 and 23 are amplified by amplifiers 25 and 27, respectively. The amplified signals are then supplied to a processing circuit 29. The photocells 21 and 23 are disposed at the two side edges (i.e., the edges defining the width) of the paper sheet P in the direction perpendicular to the feeding direction indicated by arrow a. When the paper sheet P is fed under the light sources 17 and 19, the light beams from the light sources 17 and 19 are shielded in accordance with the size of the dog ear of the paper sheet P. At this time, the output signals from the photocells 21 and 23 are amplified by the amplifiers 25 and 27, respectively, and are then supplied to the processing circuit 29. The processing circuit 29 counts each output signal for a predetermined time interval to detect a folded size l.

However, in the dog ear detection apparatus of the type described above, when the paper sheet P is misaligned or when the sizes of the paper sheets differ slightly, the output signals from the photocells 21 and 23 will vary greatly, resulting in a large error in the count value. As shown in FIGS. 5A to 5D, misalignment and variation in the size of the paper sheet results in a change in the folded size l. Therefore, the detected folded size is determined to be smaller than the actual folded size.

SUMMARY OF THE INVENTION

It is, therefore, an object of the present invention to provide a profile and feeding state detection apparatus and method for very precisely detecting a profile, such as a width, and any damage, puncture or corner folding of a paper sheet, as well as feeding states such as skew and misalignment of the paper sheet.

In order to achieve the above object of the present invention, there is provided a profile and feeding state detection apparatus, comprising:

(a) a light source disposed above or below a paper sheet;

(b) an optical system opposing said light source through the paper sheet;

(c) a sensor disposed in a direction perpendicular to a feeding direction of the paper sheet, for scanning two detection areas which are split with respect to a center of feeding; and (d) electronic processing circuit means for processing an output signal from the sensor.

BRIEF DESCRIPTION OF THE DRAWINGS

Other objects and features of the present invention will be apparent from the following description taken in connection with the accompanying drawings, in which:

FIGS. 10A through 10D are timing charts of timing signals produced by a timing signal generator shown in FIG. 9, in which FIG. 10A shows a timing signal $T_1$ which designates a first length $A_1$ shown in FIG. 7, FIG. 10B shows a timing signal $T_2$ which designates a second length $A_2$ shown in FIG. 7, FIG. 10C shows a timing signal $T_3$ which designates a third length $A_3$ shown in FIG. 7, and FIG. 10D shows an interrupt timing signal T4;

FIGS. 12C to 12H are flow charts showing various subroutines shown in FIG. 12B, in which FIG. 12C shows a subroutine "width determination", FIGS. 12D and 12E show a subroutine "damage determination", FIG. 12F shows a subroutine "skew determination I", FIG. 12G shows another subroutine "skew determination II", FIG. 12H shows a subroutine "misalignment determination"

DETAILED DESCRIPTION OF THE PREFERRED EMBODIMENT

Figure 6:
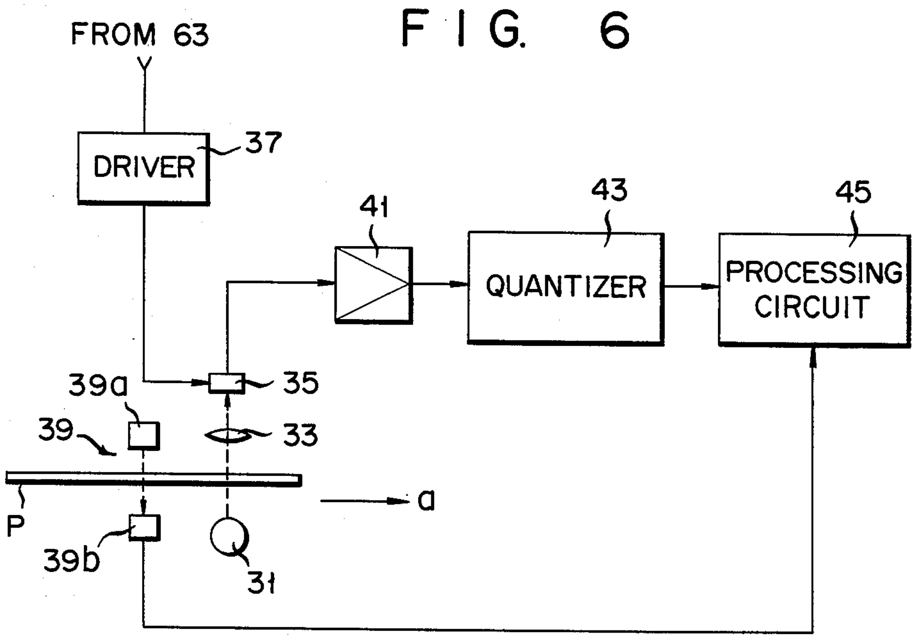
FIG. 6 is a schematic view of a profile and feeding state detection apparatus according to an exemplary embodiment of the present invention.
Figure 8:
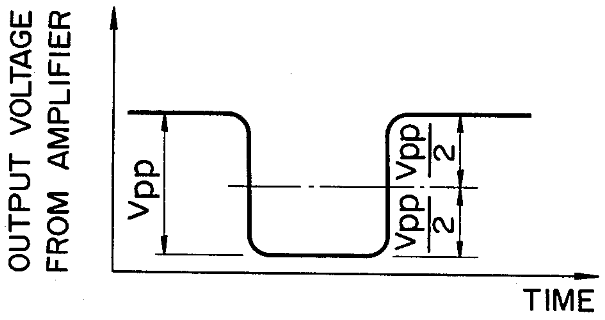
FIG. 8 is a timing chart of a signal for showing a quantification method of the quantifier shown in FIG. 6.
Figure 7:
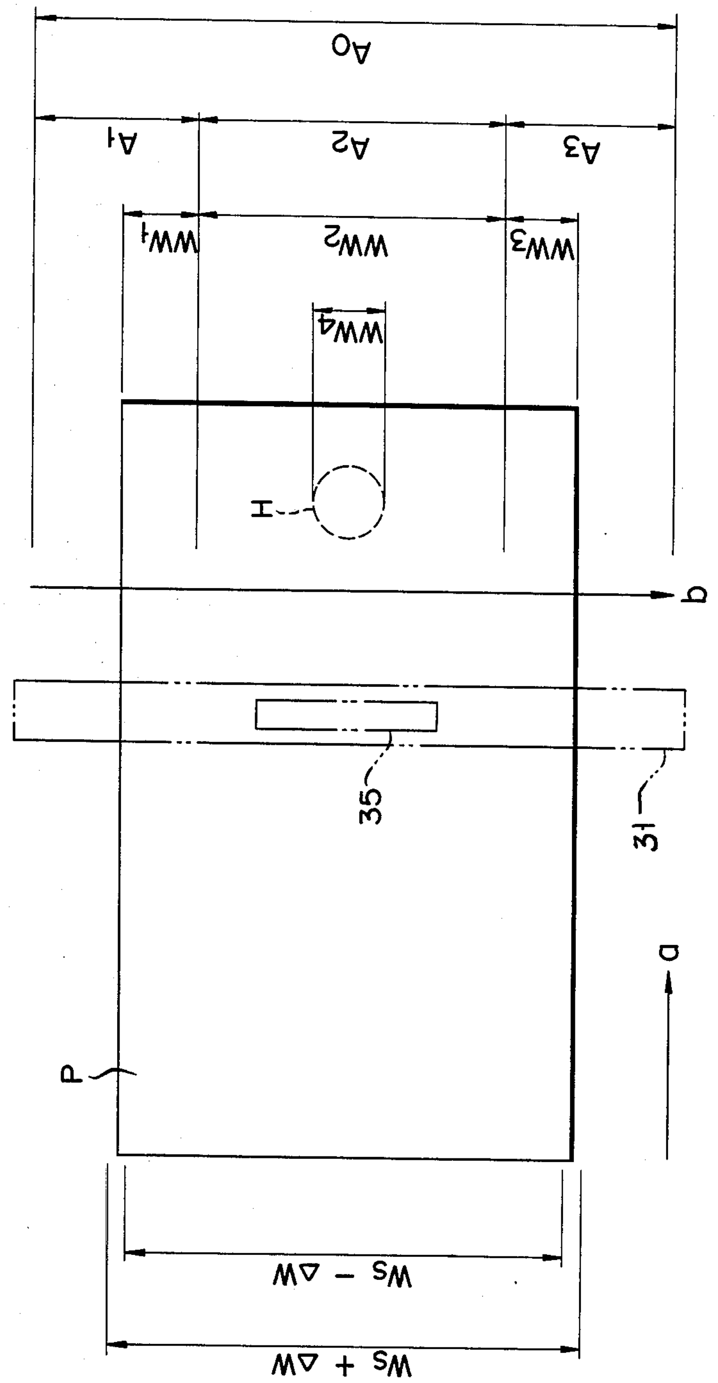
FIG. 7 is shows detection range and operation of a line sensor for detecting a width of the paper sheet.

Referring to FIG. 6, a paper sheet P such as a banknote is fed along the direction indicated by arrow a. A rod-shaped light source 31 such as a fluorescent lamp is disposed in the direction perpendicular to the feeding direction indicated by arrow a. The light source 31 radiates light beams onto the lower surface of the paper sheet P. The rod-shaped light source 31 has a sufficient length to cover length $A_0$ as shown in FIG. 7. An optical system 33 reduces an image of the paper sheet P to a ratio of 1/m. The image reduced in scale by the optical system 33 is focused on a line sensor 35. The line sensor 35 comprises a self-scan type photoelectric transducer having a number of solid-state image pickup elements which are linearly aligned in the direction perpendicular to the feeding direction indicated by arrow a. The line sensor 35 scans the length (range) $A_0$ in the direction indicated by arrow b. Therefore, the length $A_0$ corresponds to the detection range of the line sensor 35. The length $A_0$ is divided into first, second and third length (ranges) $A_1$, $A_2$ and $A_3$. The second length $A_2$ is located substantially at the central portion of the paper sheet P to be fed. The line sensor 35 is driven by a driver 37. A detector unit 39 detects the leading edge of the paper sheet P and supplies an output signal to a processing circuit 45 to be described later. The detector unit 39 comprises a light source 39*a* and a light-receiving element 39*b* and is located in a predetermined position in front of the line sensor 35 with respect to the feeding direction. The output signal from the line sensor 35 is amplified by an amplifier 41 and is then supplied to a quantizer 43. The quantizer 43 quantizes in units of bits the output signal which is produced by the line sensor 35 and amplified by the amplifier 41. In this case, as shown in FIG. 8, in which a signal waveform for one bit is enlarged, the quantizer 43 slices the output signal at a slice level ($V_{pp}/2$) corresponding to about one-half of an amplitude $V_{pp}$ obtained by a change in the paper sheet P. Thus, quantized data is obtained. An output signal from the quantizer 43 is supplied to the processing circuit 45 which executes various types of different operations.

Figure 1:
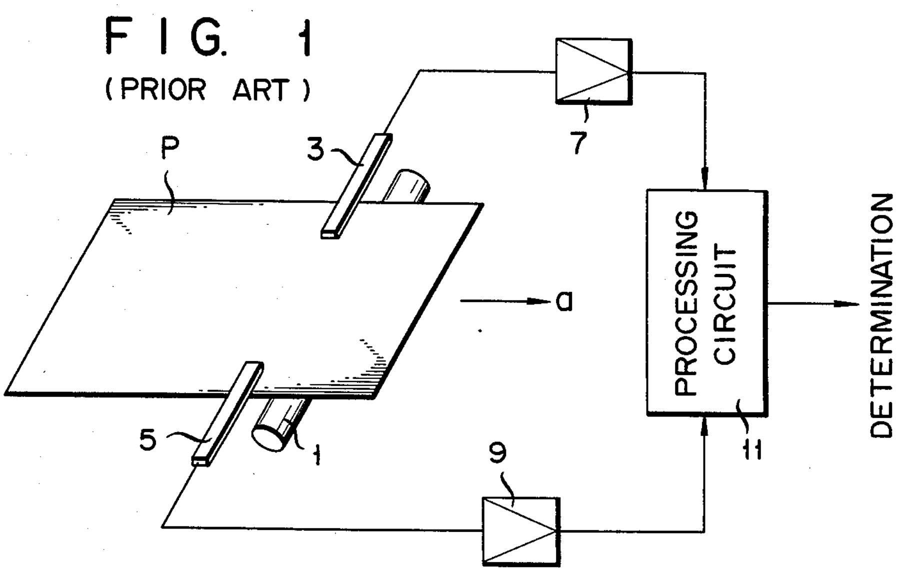
FIG. 1 (PRIOR ART)
FIG. 1 is a schematic view of a conventional profile and feeding state detection apparatus for a paper sheet.
Figure 2:
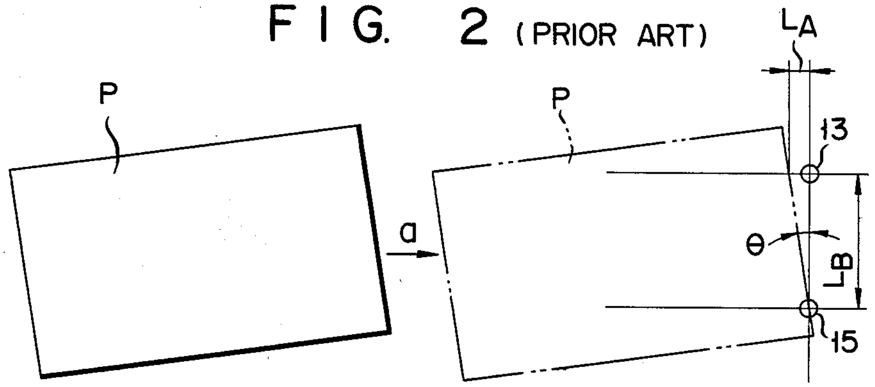
FIG. 2 (PRIOR ART)
FIGS. 2 and 3 show skew detection according to conventional methods.
Figure 3:
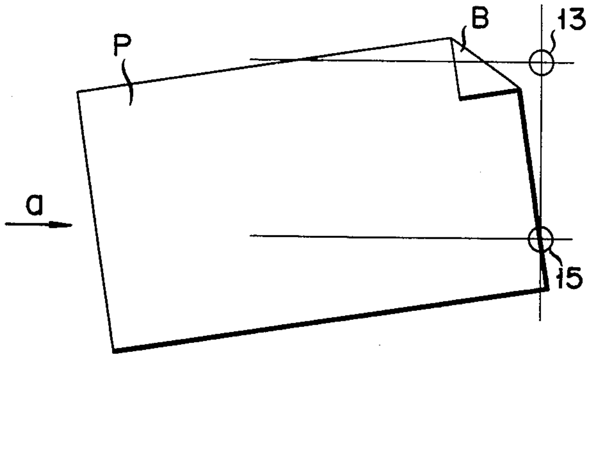
FIG. 3 (PRIOR ART)
Figure 4:
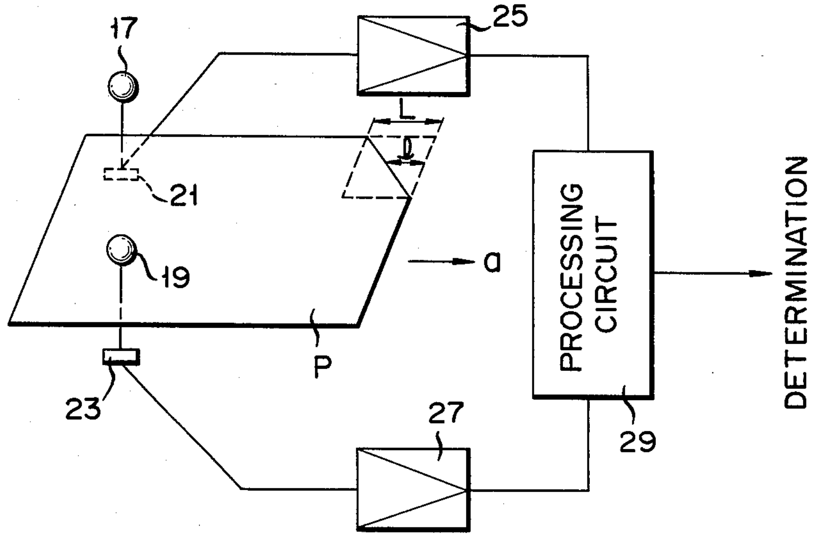
F I G. 4 (PRIOR ART)
FIG. 4 is a schematic view of a conventional dog ear detection apparatus.
Figure 5A:
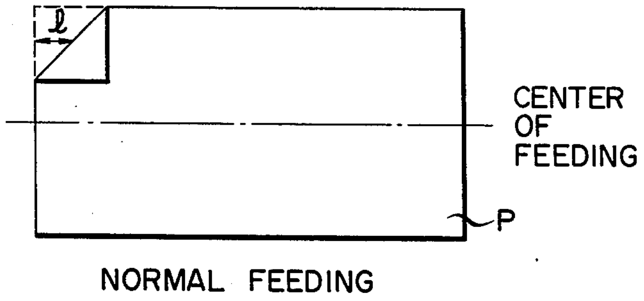
F I G. 5A (PRIOR ART)
FIGS. 5A to 5D show dog ear detection according to conventional techniques.
Figure 5B:
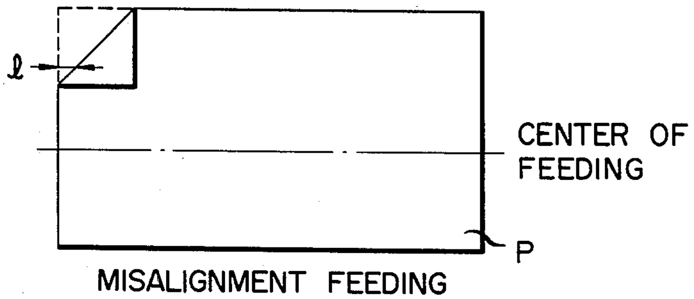
F I G. 5B (PRIOR ART)
Figure 5C:
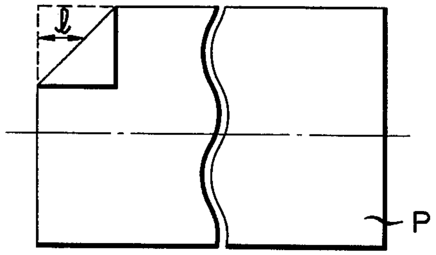
F I G. 5C (PRIOR ART)
Figure 5D:
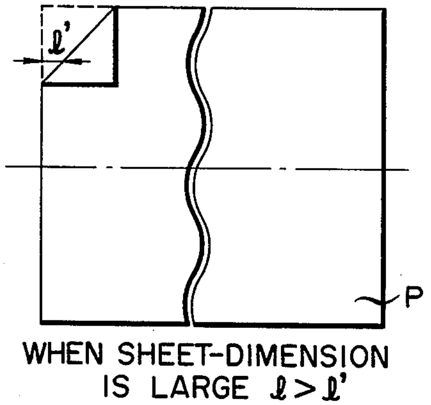
F I G. 5D (PRIOR ART)
Figure 9:
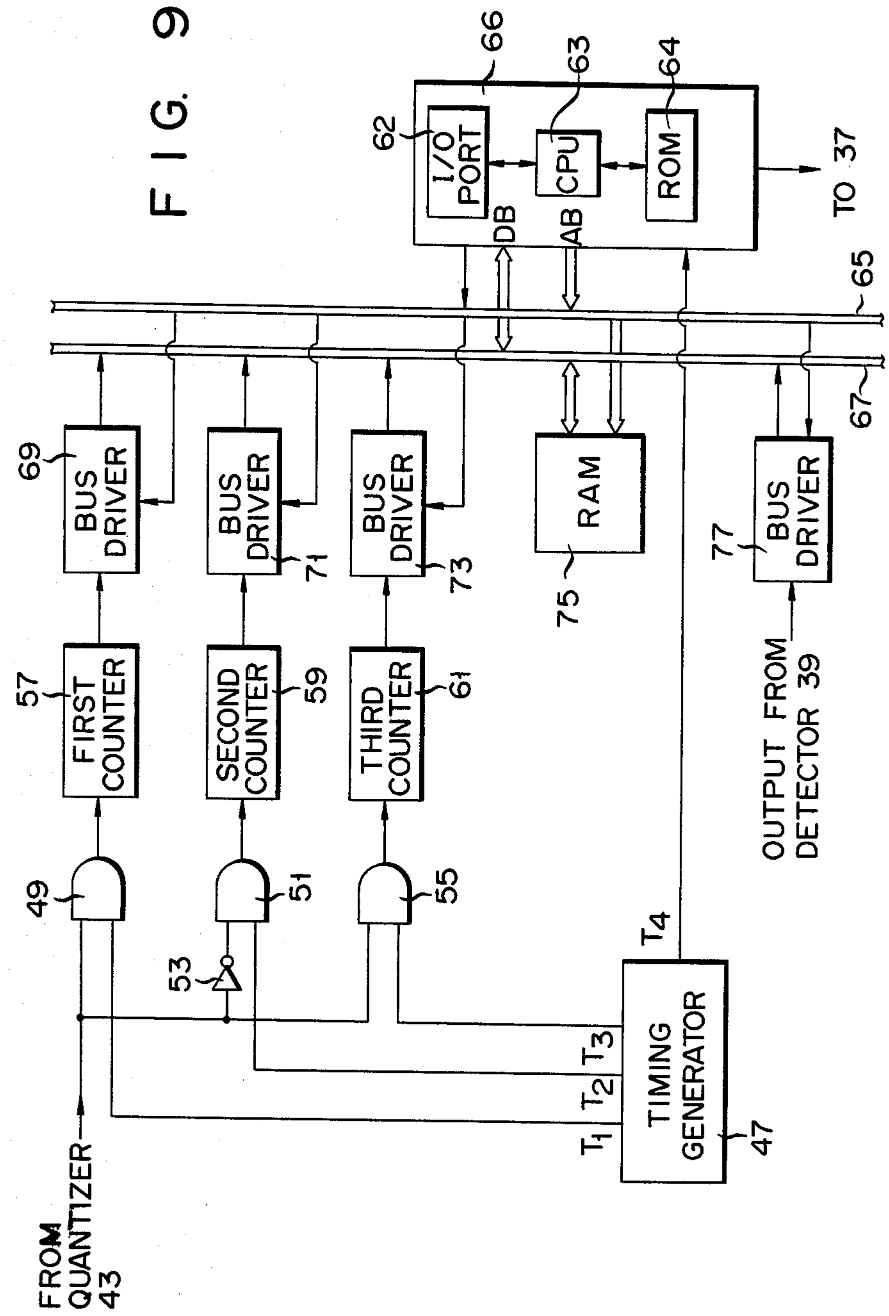
FIG. 9 is a detailed block diagram of a processing circuit shown in FIG. 6.

FIG. 9 is a detailed block diagram of the processing circuit 45 shown in FIG. 6. A timing generator 47 sequentially produces timing signals $T_1$, $T_2$ and $T_3$ (FIGS. 10A to 10C) which respectively specify the first, second and third lengths $A_1$, $A_2$ and $A_3$ (FIG. 7), in synchronism with each scanning of the line sensor 35. The timing generator 47 further produces an interrupt timing signal $T_4$ (FIG. 10D) at a time interval after the timing signal $T_3$ is produced and before the next timing signal $T_1$ is produced for the next scanning cycle. An AND gate 49 receives an output from the quantizer 43 and the timing signal $T_1$ and produces a signal of logic level "1" if they are both at logic level "1". An AND gate 51 receives a signal which is produced by the quantizer 43 and inverted by an inverter 53, and the timing signal $T_2$. If both input signals are at logic level "1", the AND gate 51 produces a logic level "1" signal. An AND gate 55 receives the output from the quantizer and the timing signal $T_3$. If both input signals are at logic level "1", the AND gate 55 produces a logic level "1" signal. The output signals from the AND gates 49, 51 and 55 are supplied to first, second and third counters 57, 59 and 61, respectively. The first counter 57 corresponds to the first length $A_1$ shown in FIG. 1 and counts the output from the AND gate 49 to measure a length $WW_1$ (a length between the leading edge of the paper sheet P and the leading edge of the second area $A_2$) shown in FIG. 7. The second counter 59 corresponds to the second length $A_2$ shown in FIG. 7 and counts the output from the AND gate 51. When a puncture or hole H (FIG. 7) is present in the second length $A_2$ of the paper sheet P, the second counter 59 counts to measure a size WW4 of the hole H. The third counter 61 corresponds to the third length $A_3$ and counts the output from the AND gate 55 to measure a length $WW_3$ (the length from the trailing edge of the second length $A_2$ to the trailing edge of the paper sheet P) shown in FIG. 7. The output signals from the first, second and third counters 57, 59 and 61 are supplied to a data bus 67 through bus drivers 69, 71 and 73, respectively. The bus drivers 69, 71 and 73 are connected to a microcomputer 66 through an address bus 65. A random access memory (RAM) 75 for storing the contents of the first, second and third counters 57, 59 and 61 is connected to the data bus 67 and the address bus 65. A bus driver 77 for transferring the output signal from the detector unit 39 onto the data bus 67 is also connected to the data bus 67 and the address bus 65. The microcomputer 66 comprises a CPU 63, a read-only memory (ROM) 64 for storing the control program or operating system, and an I/O port 62. The microcomputer 66 may comprise an 8-bit microprocessor TMP 8085 AP (TOSHIBA Corporation, Japan). The microcomputer 66 is connected to the timing generator 47 and to the RAM 75 and the bus drivers 69, 71, 73 and 77 via the address bus 65 and the data bus 67, so as to execute various types of different operations.

The mode of operation of the profile and feeding state detection apparatus and method according to an embodiment of the present invention will be described with reference to FIGS. 12A to 12J. When the detection operation is started, in step 79, the CPU 63 determines whether or not the leading edge of the paper P is detected. In other words, the CPU 63 enables the bus driver 77 through the address bus 65 to fetch the output from the detector unit 39 across the data bus 67. The CPU 63 then checks in step 79 whether or not the output signal from the detector unit 39 is at a "dark" level, that is, a level obtained when the light beams from the light source 31 are interrupted by the paper sheet P. If the decision of step 79 is answered YES, that is, if it is determined that the paper sheet P is fed in the feeding direction indicated by arrow a and the leading edge of the paper sheet P is detected by the detector unit 39, the CPU 63 executes step 81. In step 81, a delay timer built into the CPU 63 is set, and the flow advances to step 83. In step 83 it is determined whether or not the delay time has timed out. If the delay time has timed out, the flow advances to step 85, and the number n (predetermined in accordance with the size of the paper sheet P to be processed) of scanning lines to be fetched is set. The line sensor 35 then starts scanning the paper sheet P. In general, folding and damage of the paper sheets frequently occur at the leading and trailing edge portions thereof. Therefore, data for such portions must not be used. Therefore, when the leading edge of the paper sheet P is detected, the delay timer is set. When a predetermined time interval t has elapsed, the number n of lines to be fetched is set, and line sensor 35 is scanned across the sheet.

Figure 11:
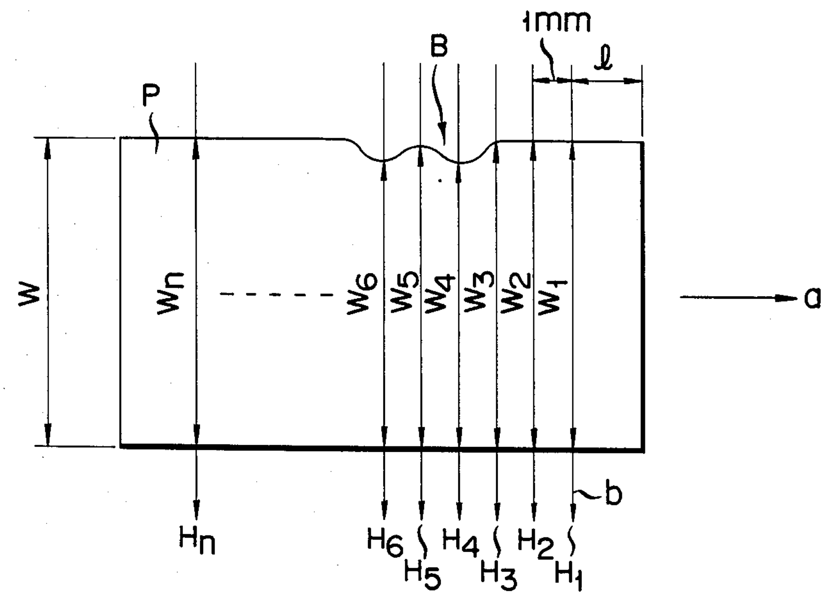
FIG. 11 shows the scanning state when the line sensor shown in FIG. 6 scans the paper sheet.

As shown in FIG. 11, when the line sensor 35 starts scanning the paper sheet P from a position spaced apart from the leading edge of the paper sheet P by a predetermined distance l (corresponding to the predetermined time interval t), the line sensor 35 sequentially scans a first scanning line $H_1$, a second scanning line $H_2$, . . . , an nth scanning line $H_n$ in the direction indicated by arrow b. Scan data of each line is then photoelectrically converted to electrical signals. In this case, a distance between two adjacent scanning lines is set to be 1 mm. Referring to FIG. 11, it can be seen that a portion B of the sheet shown there is damaged. The output signal from the line sensor 35 is amplified by the amplifier 41 and is then supplied to the quantizer 43. The amplified signal is quantized in units of bits in the quantizer 43. More specifically, when the output signal from the line sensor 35 is set to the "dark" level, the quantizer 43 produces a signal of logic level "1". However, when the output signal from the line sensor 35 is set to the "light" level (a level obtained when the light beams from the light source 31 are not interrupted by the paper sheet P), the quantizer 43 produces a signal of logic level "0". The above operation by the line sensor 35 is performed in units of bits. Thus, quantized signals of logic level "1" and of logic level "0" are supplied to the processing circuit 45.

Figures 10A, 10B, 10C, 10D:
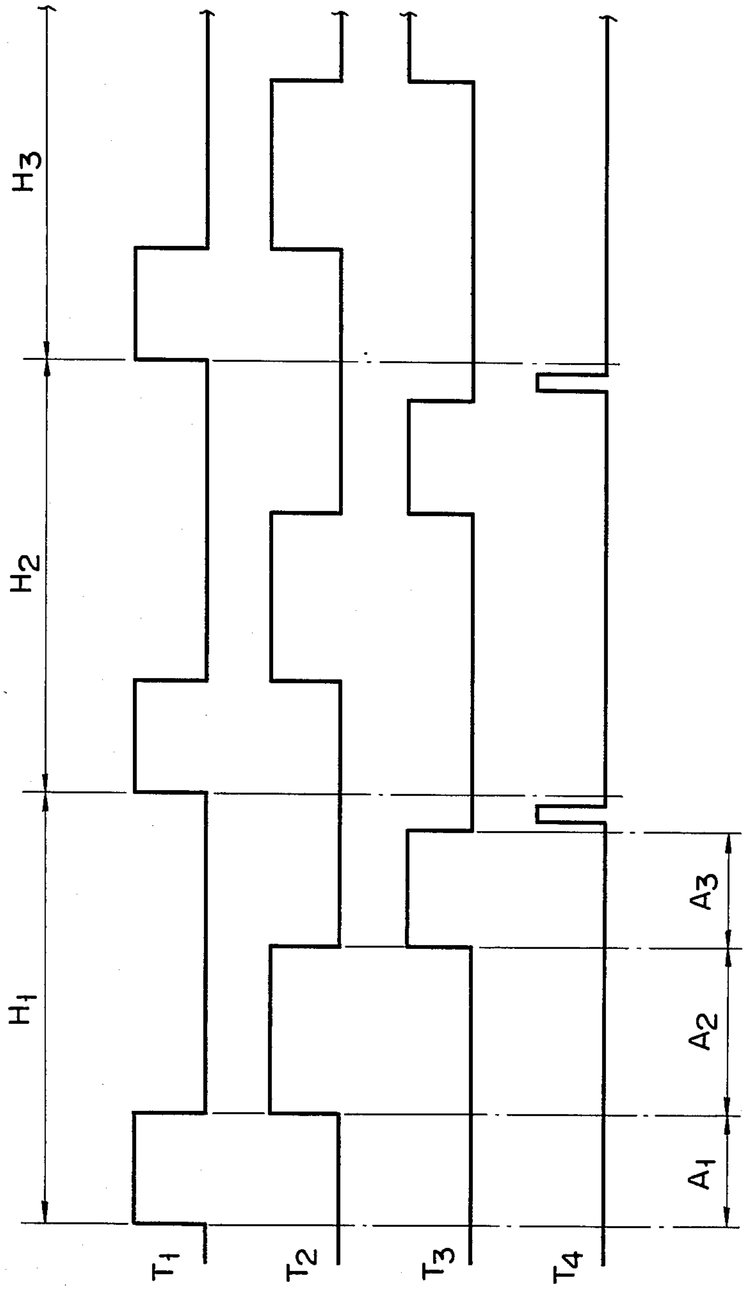

In the processing circuit 45, since the timing generator 47 sequentially supplies the timing signals $T_1$, $T_2$ and $T_3$ (FIGS. 10A to 10C) to the AND gates 49, 51 and 55, respectively, the first counter counts the output signal or the signal of logic level "1" from the quantizer 43 for a period during which the timing signal $T_1$ is ON, to measure the length $WW_1$ shown in FIG. 7. The second counter 59 counts the output or the signal of logic level "1" from the inverter 53 to measure the size $WW_4$ of hole H when the puncture of hole H is present during the time the timing signal $T_2$ is ON. Furthermore, the third counter 61 counts the output or the signal of logic level "1" from the quantizer 43 during the period the timing signal $T_3$ is ON to measure the length $WW_3$ shown in FIG. 7. When the interrupt timing signal $T_4$ shown in FIG. 10D is supplied from the timing generator 47 to the CPU 63, the CPU 63 executes step 87. In step 87, the contents (one-line data for each of lengths $WW_1$ and $WW_3$ and of size $WW_4$) of the first, second and third counters 57, 59 and 61 are read out and are fetched from the CPU 63. The CPU 63 enables the bus drivers 69, 71 and 73 via the address bus 65 to read out the contents of the first, second and third counters 57, 59 and 61, and fetches these contents. When the CPU 63 has fetched and stored the contents, it executes step 89.

In step 89, the CPU 63 causes the one-line data for each of the lengths $WW_1$ and $WW_3$ and the size $WW_3$ to be stored in the RAM 75. Step 91 is then executed. Step 91 determines whether or not the number of lines to be fetched has reached n. If the decision of step 91, is answered NO, step 87 is reexecuted and the above operation is repeated. The three types of data for the lengths $WW_1$ and $WW_3$ and the size $WW_4$ are obtained for lines from the first scanning line $H_1$ to the nth scanning line $H_n$ by means of the first, second and third counters 57, 59 and 61, respectively. When the three types of data are obtained, these pieces of data are fetched from the CPU 63 in response to the interrupt timing signal $T_4$ shown in FIG. 10D and are stored in the RAM 75.

When scanning is completed from the first scanning line $H_1$ to the nth scanning line $H_n$ and when the number of lines to be fetched reaches n in step 91, the CPU 63 stops fetching and storing data and executes step 93. In step 93, the data for the length $WW_1$ and the data for the length $WW_3$ which correspond to each line are sequentially read out beginning with the data of the first scanning line $H_1$ and preceeding to that of the nth scanning line $H_n$. In accordance with the set of readout data, widths $W_1, W_2, \ldots, W_n$ of the paper sheet P at the corresponding lines are obtained in step 95. Assume the scanning line be $H_i$ (i=1 to n). Then, a width $W_i$ of the scanning line Hi is given by the following equation.

$$W_i = WW_{i1} + WW_2 + WW_{i3} \qquad (1)$$

where $WW_{i1}$ is the length $WW_1$ of the scanning line $H_i$, $WW_{i3}$ is the length $WW_3$ of the scanning line $H_i$, and $WW_2$ is a constant representing the length of the second area $A_2$ shown in FIG. 7. Therefore, $$WW_2 = C \text{ (C: constant)}$$

Equation (1) can be rearranged in the following manner:

$$W_i = C + WW_{i1} + WW_{i3} \qquad (2)$$

Values of the width $W_i$ can be obtained in the form of $W_1, W_2, W_3, \ldots, W_n$ for each of the first scanning line $H_1$ to the nth scanning line $H_n$. In step 95, the CPU 63 performs operations based on the following equations:

$$\left.\begin{aligned} W_1 &= C + WW_{11} + WW_{13} \\ W_2 &= C + WW_{21} + WW_{23} \\ &\vdots \\ W_n &= C + WW_{n1} + WW_{n3} \end{aligned}\right\} \qquad (3)$$

Using the above equations, the widths $W_1, W_2, W_3, \ldots, W_n$ for each scanning line can be obtained. The CPU 63 then calls for subroutine "width determination" 97 to determine the final width W of the paper sheet P.

Figure 12A:
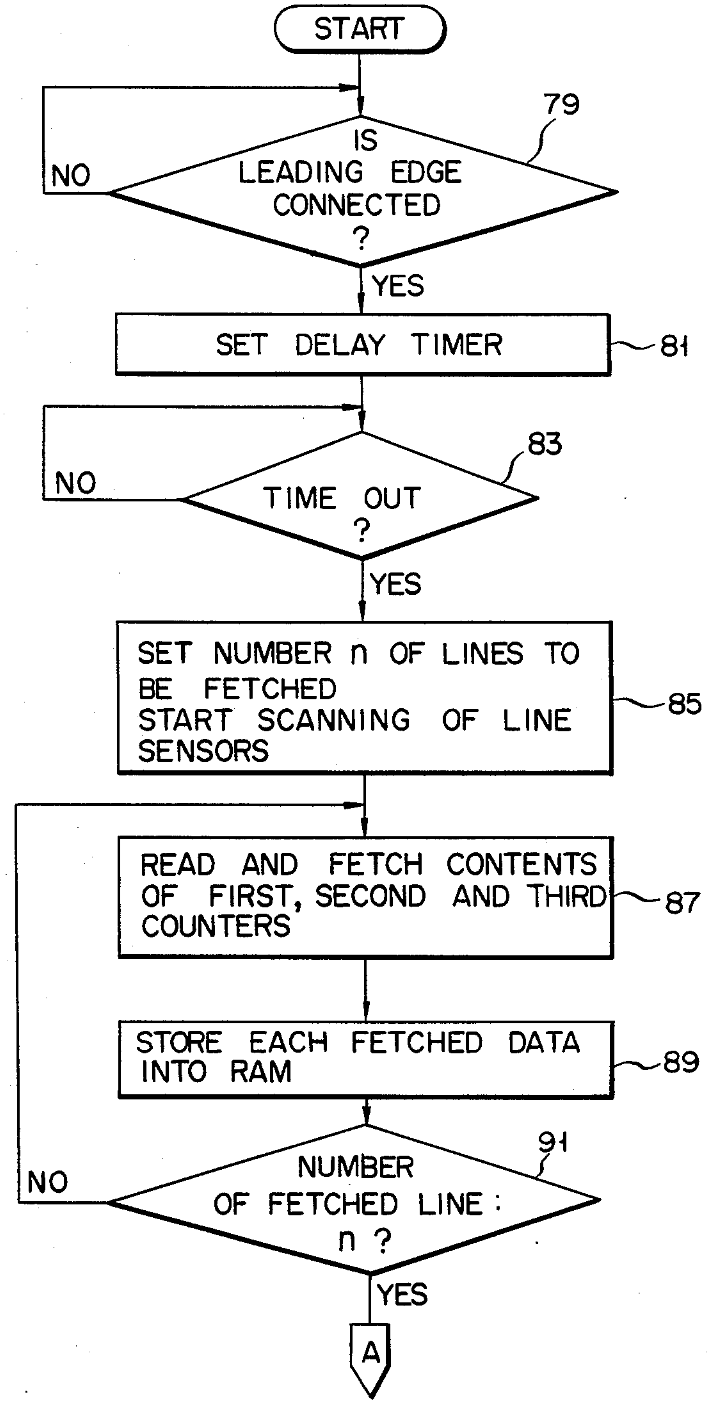
FIGS. 12A and 12B are flow charts showing the main routines executed by the CPU shown in FIG. 9.
Figure 12B:
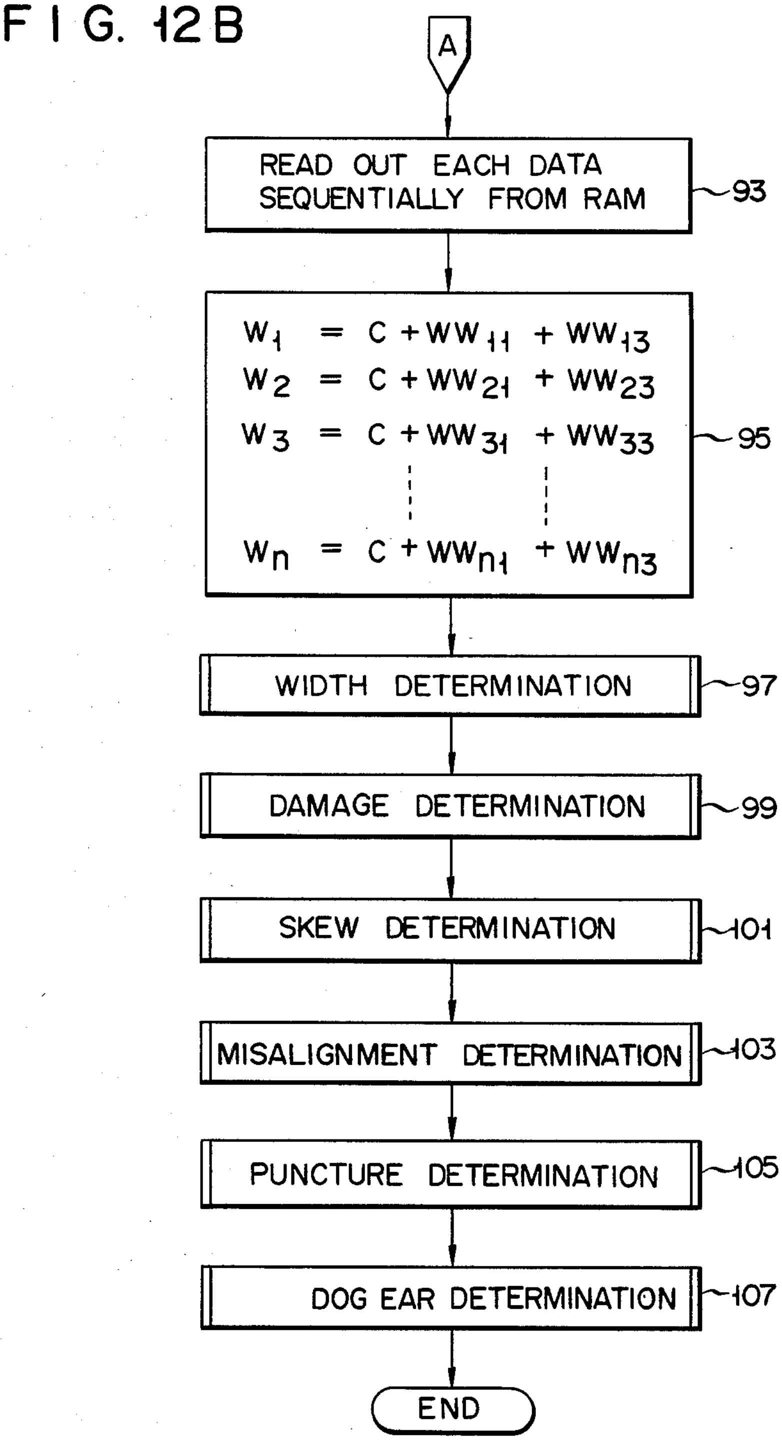
Figure 12C:
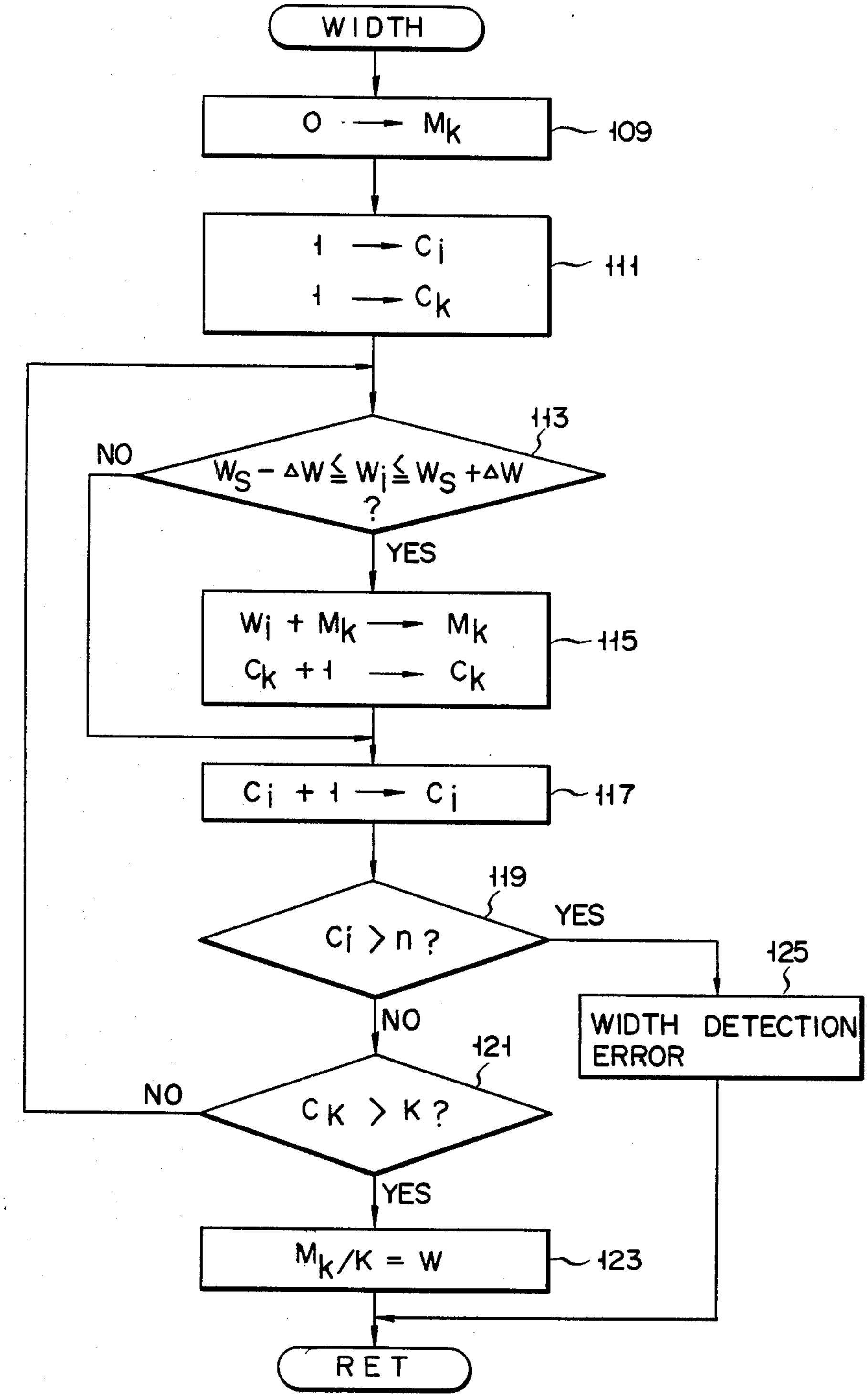

FIG. 12C is a flow chart of the "width determination" subroutine 97. In step 109, the CPU 63 clears a total memory $M_k$ for obtaining the total value of the widths $W_i$ numbering k (e.g., 15) which satisfy the condition to be described shortly. The flow advances to step 111. In step 111, 1 is respectively set in a counter $C_i$ for counting the check frequency of each value or width of $W_1, W_2, W_3, \ldots, W_n$ so as to select the width $W_i$ which satisfies the condition to be described shortly, and in a counter $C_k$ for counting the number k of $W_i$ finally obtained. The CPU 63 then executes step 113, which determines whether each one $W_i$ of the values (widths) $W_1, W_2, W_3, \ldots, W_n$ obtained in step 95 satisfies the condition of equation (4) as follows:

$$W_s - \Delta W \leqq W_i \leqq W_s + \Delta W \qquad (4)$$

where $W_s$ is the standard value or width of the paper sheet P, and $\Delta W$ Is the allowance including the manufacturing error and the measuring error of the paper sheet P. If the value or width $W_i$ satisfies equation (4), the CPU 63 executes step 115. In step 115, the value or width $W_i$ which satisfies equation (4) is added to the storage content of the total memory $M_k$. The sum is then stored in the total memory $M_k$. Further, the contents of the counter $C_k$ are increased by one (incremented). The CPU 63 then executes step 117. However, if NO is the result in step 113, the CPU executes steps 117 instead. The values or widths $W_i$ (e.g., $W_1$) of one scanning line $H_i$ are thus completely checked. In step 117, the counts of the counters $C_i$ are increased by one, and the CPU 63 executes step 119. In step 119 it is determined whether the count of the counter $C_i$ is greater than n, that is, all the values or widths $W_1, W_2, W_3, \ldots, W_n$ are checked. If the decision of step 119 is answered NO, that is, if $C_i > n$ is not true, all the values are not checked. The CPU 63 executes step 121. In step 121 it is determined whether the count of the counter $C_k$ is greater than k, that is, whether the number of obtained values $W_i$ which satisfy the above condition has reached k. If step 121 is answered NO, the number of obtained values $W_i$ has not reached k, so that the flow returns to step 113. The above operation is then repeated. However, if the decision of step 121 is answered YES, that is, if the condition $C_k > k$ is true, the number of obtained values $W_i$ has reached k (e.g., 15). The CPU 63 then executes step 123 to obtain the means value of the values $W_i$ divided by k. The total of the values $W_i$ numbering k is stored in the total memory $M_k$. When the CPU 63 performs equation (5), the means value described above is obtained and is then defined as the final width W of the paper sheet P as follows:

$$M_k / K = W \qquad (5)$$

The values $W_i$ numbering k which satisfy equation (4) are selected from among the widths $W_1, W_2, W_3, \ldots, W_n$ which correspond to each line by step 95. The mean value of the values $W_i$ divided by k is defined as the width W of the paper sheet P. If the condition $C_i > n$ is true as tested for by step 119, the values $W_i$ which satisfy the above condition do not number k even if all the values $W_1, W_2, W_3, \ldots, W_n$ have been checked. Therefore, in this case, the CPU 63 determines that a width detection error has occurred and then executes step 125. In step 125, data of the width detection error is stored, and the "width determination" subroutine 97 is completed.

In the width detection procedure described above, the paper sheet P is scanned by the line sensor 35 with a predetermined frequency (n times) in the direction perpendicular to the feeding direction indicated by arrow a. Thus, a plurality of widths $W_1, W_2, W_3, \ldots, W_n$ are measured by scanning the lines $H_1, H_2, H_3, \ldots, H_n$ in the direction perpendicular to the feeding direction indicated by arrow a. As a result, the values $W_i$ (i=1 to n) which satisfy equation (4) are selected to number k (e.g., 15). The mean value of the selected values $W_i$ is determined to be the width W of the paper sheet P. Even if the paper sheet P has a dog ear and/or a damaged portion, and even if the paper sheet P varies in thickness and is solid, proper width detection is nevertheless performed. The detection area of the line sensor 35 is divided into a plurality of lengths (dimensions). A set of data (corresponding to the lengths $WW_1$ and $WW_3$) obtained from the respective lengths is used to perform predetermined operations to measure the values or widths $W_1, W_2, W_3, \ldots, W_n$, so that highly precise measurement is performed and hence, accurate width detection can be performed.

Since the quantization level or the slice level of the quantizer 43 is constantly determined to be substantially one-half of an amplitude corresponding to a change in the paper sheet P, errors are substantially eliminated regardless of whether the paper sheet P is new or old. When the total of the first, second and third lengths $A_1$, $A_2$ and $A_3$ is, for example, 100 mm and when the line sensor 35 comprises a capacity of 1,024 bits, the resolution along the direction of the scanning line is given by equation (6):

$$100\ (\text{mm}) \div 1024 \approx 0.1\ (\text{mm}) \quad (6)$$

As is apparent from equation (6), highly precise detection can be achieved with a simple construction at low cost. Therefore, the above width detection is effectively performed even for a banknote which is very thin and easily soiled.

In the embodiment described above, the detection range of the line sensor is divided into three areas to improve the precision of the measured values. However, the detection rnage may be divided into more than three lengths. The resolution of the line sensor in the feeding direction and the resolution thereof in the scanning direction are 1 mm and 0.1 mm, respectively. These values may be arbitrarily changed in accordance with a required width measuring precision of the paper sheet to be detected.

Figure 12D:
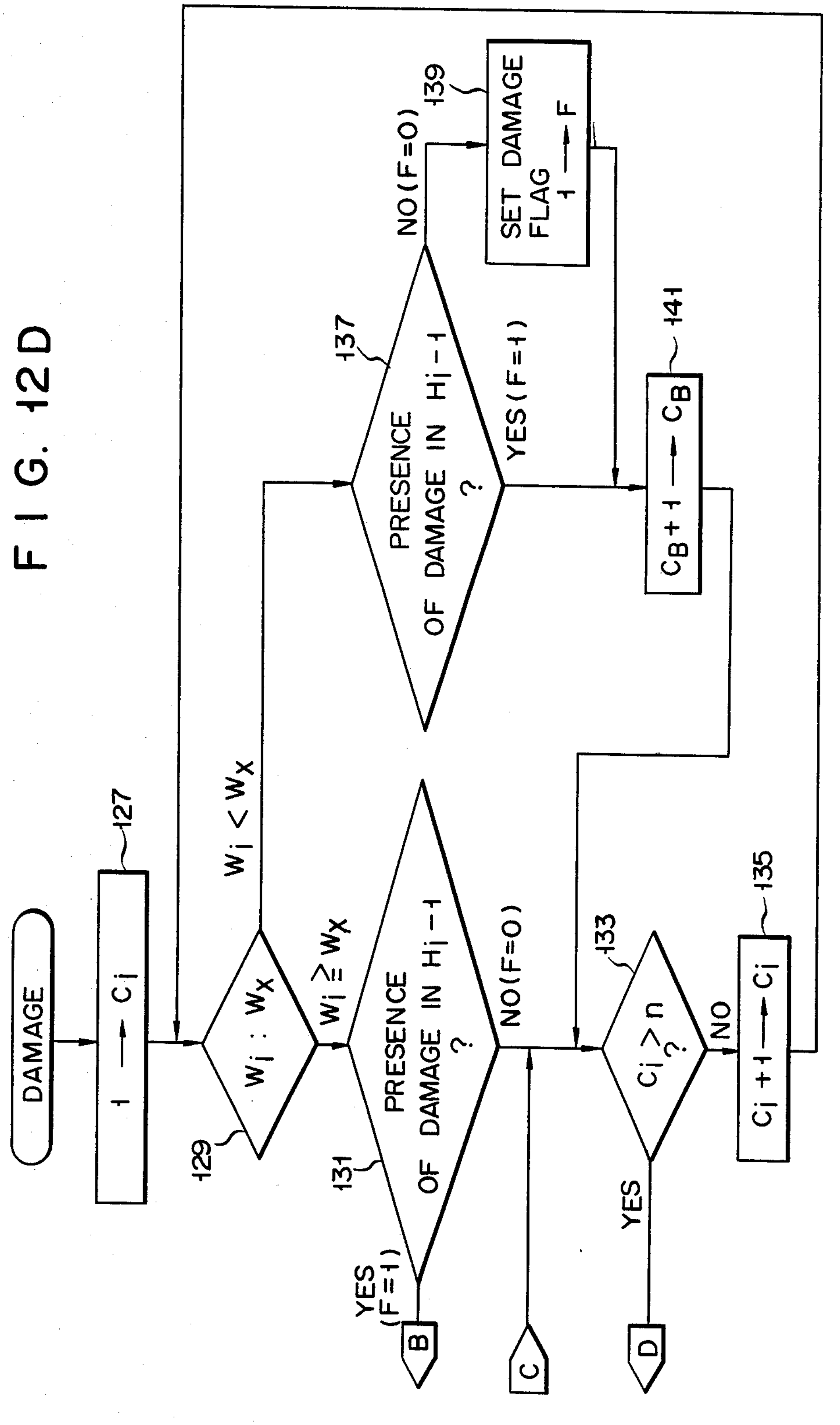
Figure 12E:
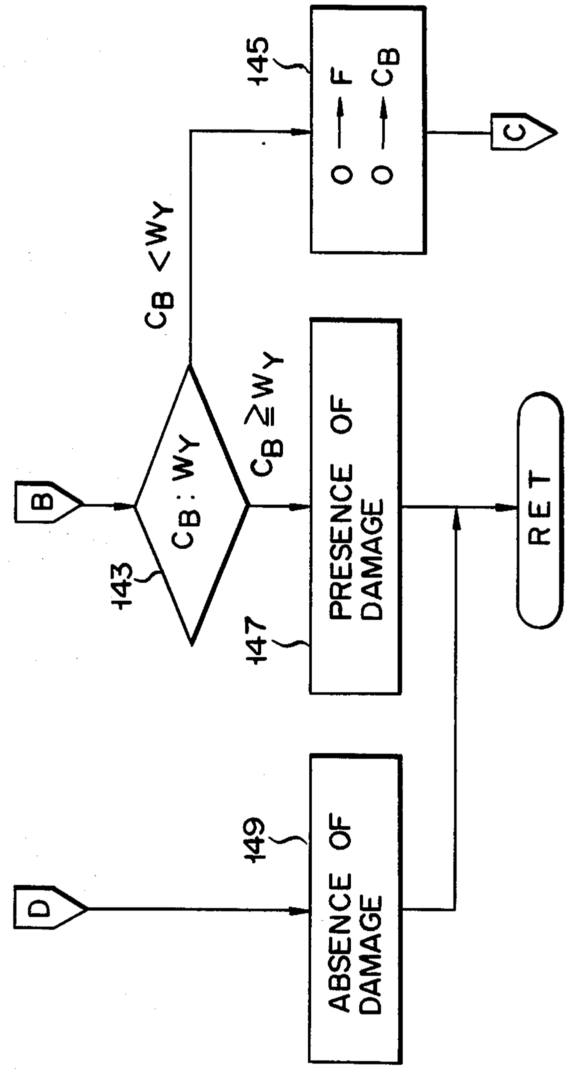

FIGS. 12D and 12E show a "damage determination" subroutine 97 of the main routine. The "damage determination" subroutine will be described in detail hereinafter. In step 127, the CPU 63 checks all the values $W_1, W_2, W_3, \ldots, W_n$ to execute the subroutine "damage determination". In order to check the frequency, 1 is set in the counter $C_i$. The CPU 63 then executes step 129. In step 129, the values $W_1, W_2, W_3, \ldots, W_n$, that is, the values $W_i$ (i=1 through n) obtained in step 95 are sequentially compared ($W_i$:$W_x$) with a reference value $W_x$. The reference value $W_x$ is used to determine whether or not the values $W_i$ indicate a damaged portion in the X direction (FIG. 13); the reference value $W_x$ is determined in advance in accordance with the size of the paper sheet P to be processed. If the measured value $W_i$ is greater than or equal to the reference value $W_x$, that is, if the condition $W_i \geqq W_x$ is established, the CPU 63 determines that no damaged portion is present in the ith scanning line $H_i$ and then executes step 131. Step 131 determines whether or not a damaged portion is present in a scanning line $H_{i-1}$, which is one line ahead of the scanning line $H_i$, by referring to the logic state (1 or 0) of a damage flag F. If the decision of step 131 is answered NO (F=logic level "0"), the CPU 63 executes step 133. Step 133 determines whether or not the count of the counter $C_i$ is greater than n is checked, that is, whether all the values $W_1, W_2, W_3, \ldots, W_n$ are checked. If it is determined that the count of the counter $C_i$ is not greater than n, that is, the condition $C_i > n$ is not true, all the values $W_1, W_2, W_3, \ldots, W_n$ have not yet been checked. The CPU 63 then executes step 135. In step 135, the count of the counter $C_i$ is increased by one in order to check the value $W_i$ of the next scanning line. The CPU 63 then re-executes step 129. The above operation is repeated to check the value $W_i$ for the next scanning line.

Figure 13:
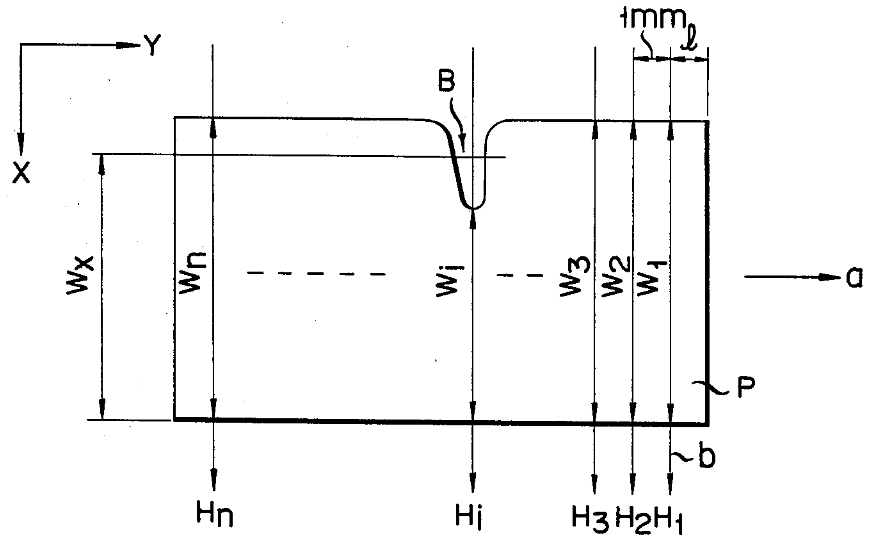
FIG. 13 shows the scanning state of the line sensor for puncture detection.

In step 129, if the measured value $W_i$ is smaller than the reference value $W_x$, that is, if the condition $W_i < W_x$ is true, the CPU 63 determines that a damaged portion is present in the ith scanning line $H_i$ and then executes step 137. In step 137, the same check as in step 131 is performed. As a result, if no damaged portion is present, that is, if the damage flag F is at logic level "0", the CPU 63 executes step 139 to set the damage flag F. Thereafter, the CPU executes step 141. However, if the decision of step 137 is answered YES, that is, if it is determined that the damage flag F is at logic level "1", the CPU 63 directly executes step 141. In step 141, the count of a damage counter CB for counting data of a width (width in the direction parallel to the feeding direction indicated by arrow a) of a damaged portion B shown in FIG. 13 is increased by one. The CPU 63 then executes step 133. The above operation is then repeated.

In this manner, values or widths $W_1, W_2, W_3, \ldots, W_n$ for each scanning line which are obtained in step 95 are sequentially checked. When any value $W_i$ which is smaller than the reference value $W_x$ is obtained for the first time, the damage flag F is set, and the count of the damage counter $C_B$ is increased by one. Thereafter, each time a value $W_i$ which is smaller than the reference value $W_x$ is obtained, the count of the damage counter $C_B$ is incremented. Therefore, when the condition $W_i \geqq W_x$ is true in step 129 after the damage flag F is set, the damage flag F is determined to be at logic level "1" in step 131. Therefore, the flow advances from step 131 to step 143. In step 143, the count of the damage counter $C_B$ is compared with a reference value $W_y$. The reference value $W_y$ is set to determine whether or not a damaged portion is present. As a result of the comparison described above, if it is determined that the count of the counter $C_B$ is smaller than the reference value $W_y$, that is, if it is determined that the condition $C_B < W_y$ is established, the CPU 63 determines that no damaged portion is present. The CPU 63 then executes step 145. In step 145, the damage flag F and the damage counter $C_B$ are reset, and the CPU 63 then executes step 133. The above operation is repeated. However, if in step 143 it is determined that the count of the counter $C_B$ is greater than or equal to the reference value $W_y$, that is, if it is determined that the condition $C_B \geqq W_y$ is true, the CPU 63 finally determines that a damaged portion B is present in the paper sheet P which is currently being checked. The CPU 63 then executes step 147 and stores data indicating that the damaged portion B is present in the paper sheet which is currently being checked. The "damage determination" subroutine is completed at this point. If it is determined in step 133 that the condition $C_i > n$ is true, the CPU 63 determines that all the values $W_1, W_2, W_3, \ldots, W_n$ are checked and the damaged portion B is not present in the paper sheet P. The CPU 63 then executes step 149 and stores data indicating the absence of the damaged portion. The "damage determination" subroutine 99 is then finished.

Figure 12F:
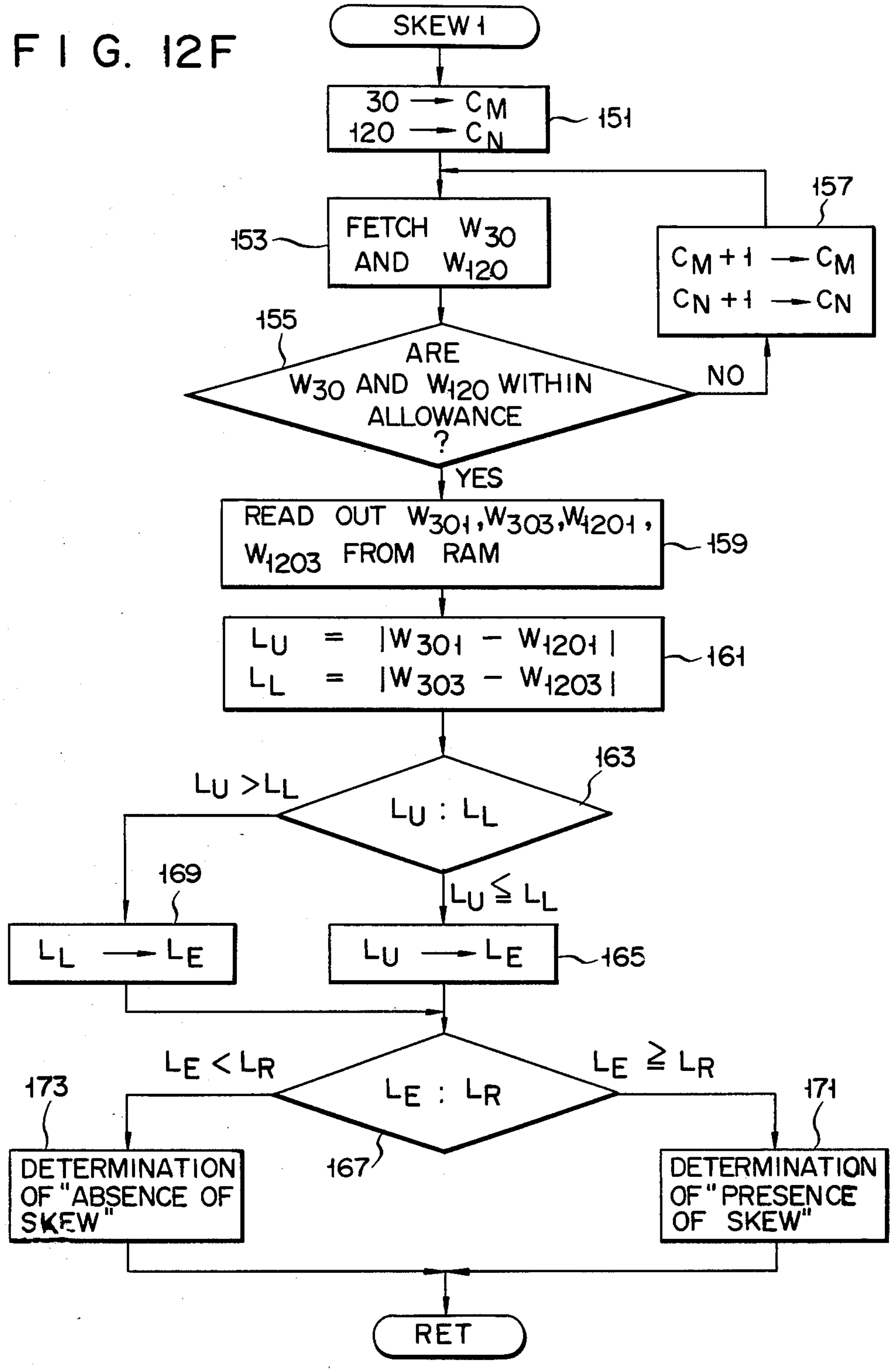
Figure 14:
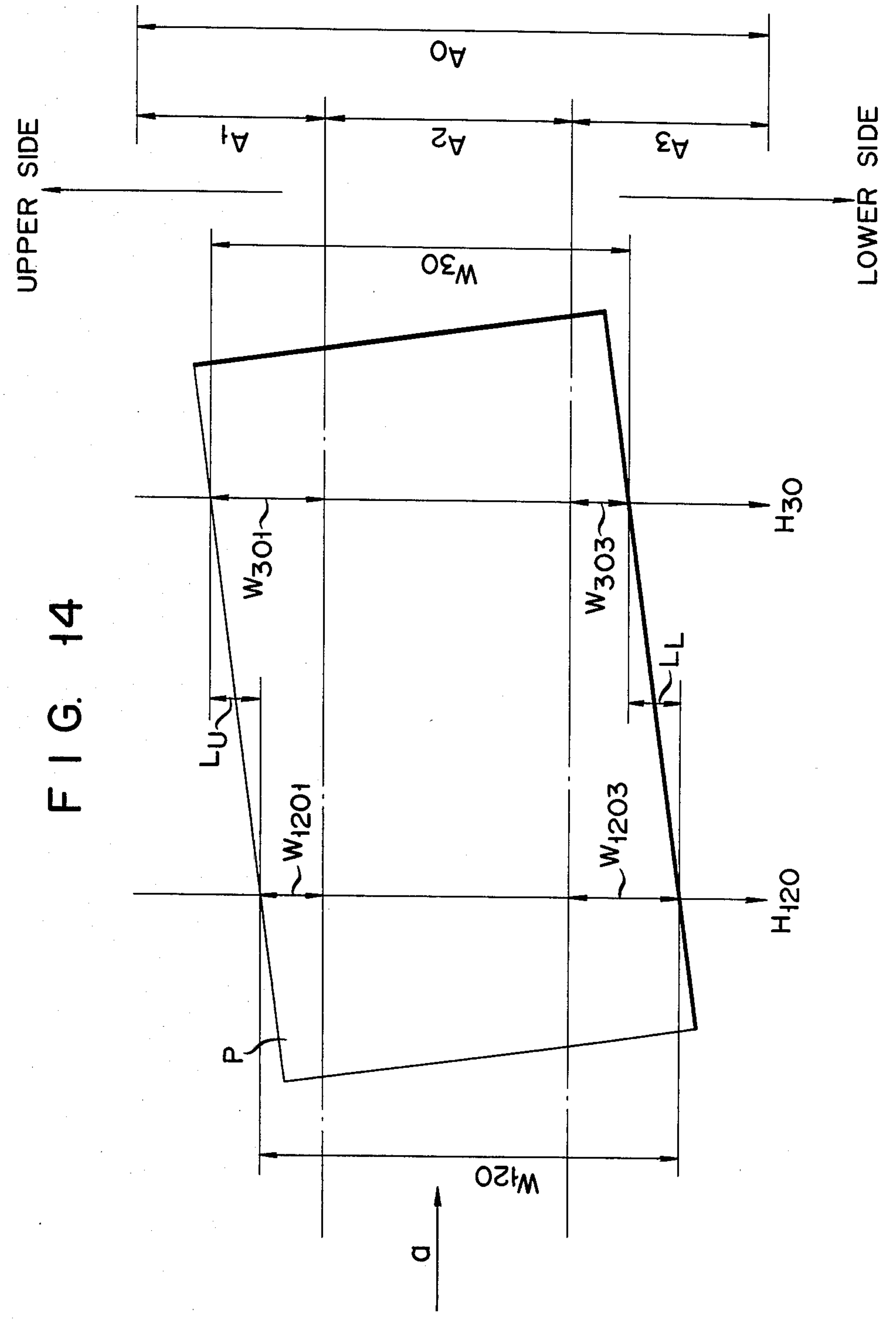
FIG. 14 shows detection of the skew I in detail.

FIG. 12F shows a "skew determination" subroutine 101 which will be described in detail hereinafter. Two pieces of data which respectively correspond to the predetermined scanning lines at two points spaced apart by a predetermined distance are stored in counters $C_M$ and $C_N$ to obtain two measured values $W_i$ at the two points spaced apart by the predetermined distance. These two measured values $W_i$ are selected from the values $W_1$, $W_2$, $W_3$, . . . , $W_n$ obtained in step 95 to perform skew detection. For example, assuming the number n of scanning lines to be fetched is 180 (n=180), data "30" is stored in the counter $C_M$, while data "120" is stored in the counter $C_N$. As shown in FIG. 14, the 30th scanning line $H_{30}$ and the 120th scanning line $H_{120}$ of the paper sheet P are selected. The CPU then executes step 153 in which measured values $W_{30}$ and $W_{120}$ at the scanning lines $H_{30}$ and $H_{120}$ respectively corresponding to the counts of the counters $C_M$ and $C_N$ are selected from the values $W_2$, $W_2$, $W_3$, . . . , $W_n$ obtained in step 95. The CPU 63 then executes step 155. Step 155 determines whether or not the measured values $W_{30}$ and $W_{120}$ fall within an allowance, that is, whether the measured values $W_{30}$ and $W_{120}$ satisfy equations (7) below:

$$\left.\begin{array}{l} W_s - \Delta W \leqq W_{30} \leqq W_s + \Delta W \\ W_s - \Delta W \leqq W_{120} \leqq W_s + \Delta W \end{array}\right\} \quad (7)$$

where $W_s$ is the standard value (width) of the paper sheet P, and $\Delta W$ is an allowance to cover both the manufacturing error and the measuring error of the paper sheet P. If the measured value $W_{30}$ and $W_{120}$ do not satisfy equations (7), they do not fall within the tolerable allowance. Therefore, in this case, the CPU 63 executes step 157 to check the following measured values $W_{31}$ and $W_{121}$. In step 157, the counts of the counters $C_M$ and $C_N$ are respectively increased by one, and the CPU 63 then re-executes step 153. The above operation is then repeated. In step 153, the CPU 63 selects the measured values $W_{31}$ and $W_{121}$. In step 155, the CPU 63 then checks the measured values $W_{31}$ and $W_{121}$.

In step 155, if it is determined that the measured values that test satisfy equations (7), the CPU 63 executes step 159. In step 159, the two measured values used in step 95 to obtain the values $W_{30}$ and $W_{120}$, that is, values or widths $W_{301}$ and $W_{1201}$ (FIG. 14) in the first length $A_1$ (the upper portion of the paper sheet P) and values or widths $W_{303}$ and $W_{1203}$ (FIG. 14) in the third length $A_3$ (the lower portion of the paper sheet P), are read out from the RAM 75. Thereafter, the CPU 63 executes step 161. In step 161, using the readout values, subtraction is performed as in equations (8) so as to obtain an upper skew distance $L_U$ and a lower skew distance $L_L$:

$$\left.\begin{array}{l} L_U = |W_{301} - W_{1201}| \\ L_L = |W_{303} - W_{1203}| \end{array}\right\} \quad (8)$$

The upper skew distance $L_U$ corresponds to an upper skew amount, and the lower skew distance $L_L$ corresponds to a lower skew amount, as shown in FIG. 14. In this manner, only when the values satisfy equations (7), that is, only when the two measured values $W_{30}$ and $W_{120}$ fall within the allowance, is subtraction performed as in equations (8) to measure the upper skew distance $L_U$ and the lower skew distance $L_L$. These measured values are defined as valid values. Therefore, even if a damaged portion is present in the paper sheet P, the measured values are not adversely affected by the presence of the damaged portion.

When the upper and lower skew amounts are determined as described above, the CPU 63 executes step 163. In step 163, the upper skew distance $L_U$ corresponding to the upper skew amount is compared ($L_U$:$L_L$) with the lower skew distance $L_L$ corresponding to the lower skew amount. If it is determined that the upper skew distance $L_U$ is smaller than or equal to the lower skew distance $L_L$, that is, if it is determined that the condition $L_U \leqq L_L$ is established, the CPU 63 executes step 165. In step 165, the CPU 63 determines that the upper skew distance $L_U$ is defined as a final skew amount $L_E$. Thereafter, the CPU 63 executes step 167. However, if in step 163 it is determined that the upper skew distance $L_U$ is greater than the lower skew distance $L_L$, that is, if it is determined that the condition $L_U > L_L$ is established, the CPU 63 executes step 169. In step 169, the CPU 63 determines that the lower skew distance $L_L$ is defined as the final skew amount $L_E$. Thereafter, the CPU executes step 167. As described above, the smaller one of the upper and lower skew distances $L_U$ and $L_L$ is defined as the final skew amount $L_E$. Therefore, even if the paper sheet P has a dog ear or a damaged portion, erroneous detection due to the presence of the dog ear or the damaged portion can be prevented. In step 167, the final skew amount $L_E$ is compared ($L_E$:$L_R$) with a reference value $L_R$ (a reference value set so as to determine whether or not the sheet is skewed). If it is determined that the final skew amount $L_E$ is greater than or equal to the reference value $L_R$, that is, if it is determined that the condition $L_E \geqq L_R$ is true, the CPU 63 finally determines that the paper sheet P which is currently being checked is skewed. The CPU 63 executes step 171 and stores data indicating that the paper sheet P is skewed, and "skew determination" subroutine 101 is completed. However, if step 167 determines that the final skew amount $L_E$ is smaller than the reference value $L_R$, that is, if it is determined that the condition $L_E < L_R$ is true, the CPU 63 finally determines that the paper sheet P is not skewed. The CPU 63 then executes step 173 and stores data indicating the determination of an absence of skew and the "skew determination" subroutine 101 is completed.

According to the skew detection procedures described above, the paper sheet P is scanned n times by the line sensor 35 in the direction perpendicular to the feeding direction. A plurality of values or widths $W_1$, $W_2$, $W_3$, . . . , $W_n$ are obtained corresponding to the n scans in the direction perpendicular to the feeding direction. Two different values, selected from the plurality of values or widths $W_1$, $W_2$, $W_3$, . . . , $W_n$ correspond to two points on the paper sheet P which are spaced apart from one another. These two values are checked to see whether or not they satisfy equations (7). Only if it is determined that these two values satisfy equations (7) is subtraction performed, using equations (8), to obtain skew distances $L_U$ and $L_L$ at the two edges located perpendicular to the feeding direction of the paper sheet P. The smaller of the skew distances $L_U$ and $L_L$ is finally defined as the final skew amount $L_E$. By comparing the final skew amount $L_E$ with the reference value $L_R$, the presence or absence of skew is detected. Therefore, even if the paper sheet P has a dog ear or a damaged portion, erroneous detection due to such defects can be properly prevented, and highly precise skew detection can be performed.

As described above, only when the two measured values satisfy equations (6), that is, only when they fall within the allowable range, is subtraction performed using equations (7) to obtain the upper and lower skew distances $L_U$ and $L_L$, thereby verifying these measured values. Thus, if a damaged portion is present in the paper sheet P, the adverse effects of the damage will be prevented. Further, since the smaller value between the upper and lower skew distance $L_U$ and $L_L$ is defined as the final skew amount $L_E$, erroneous detection is also prevented even if the paper sheet P has a dog ear or a damaged portion.

Figure 12G:
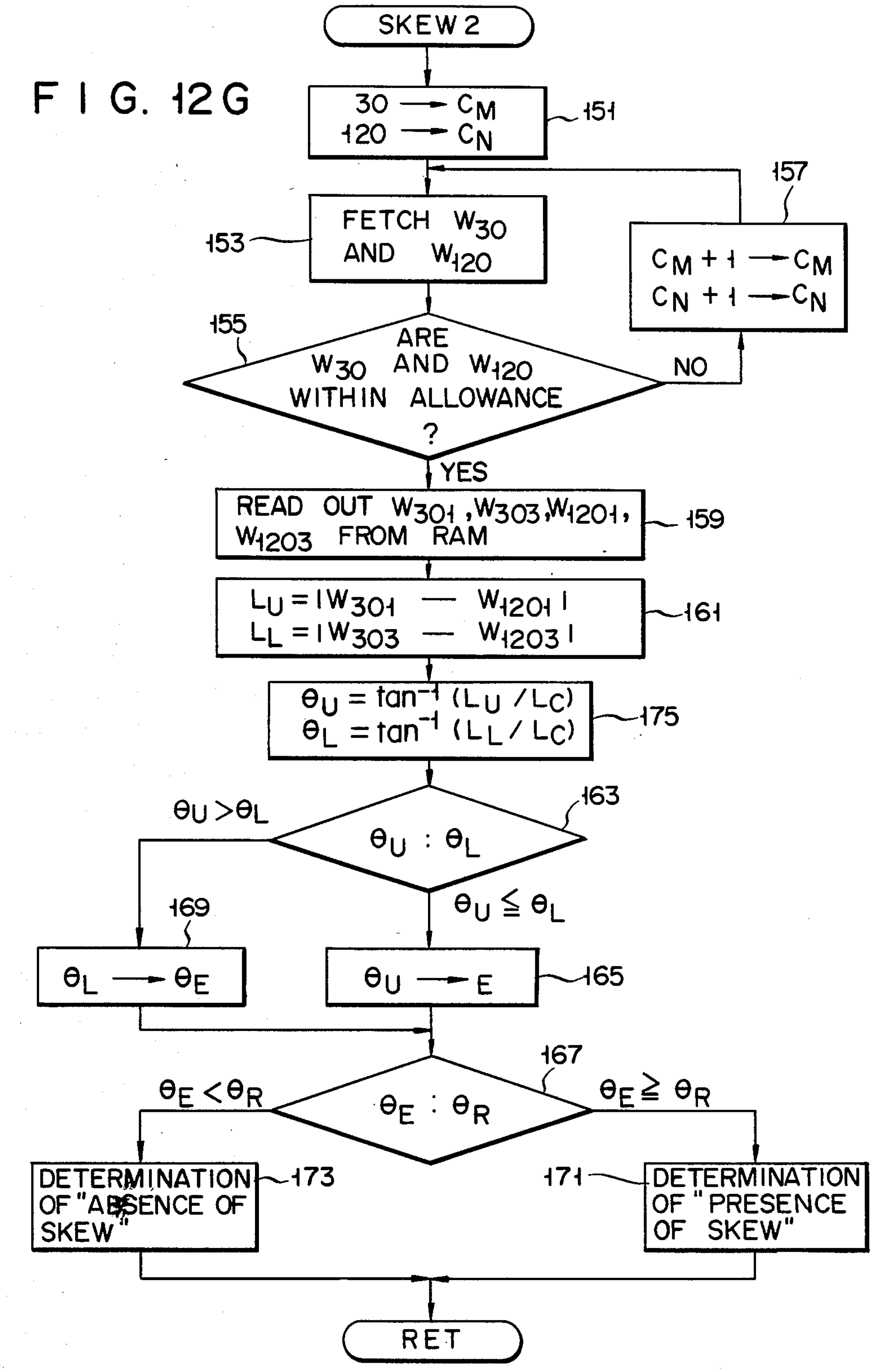
Figure 15:
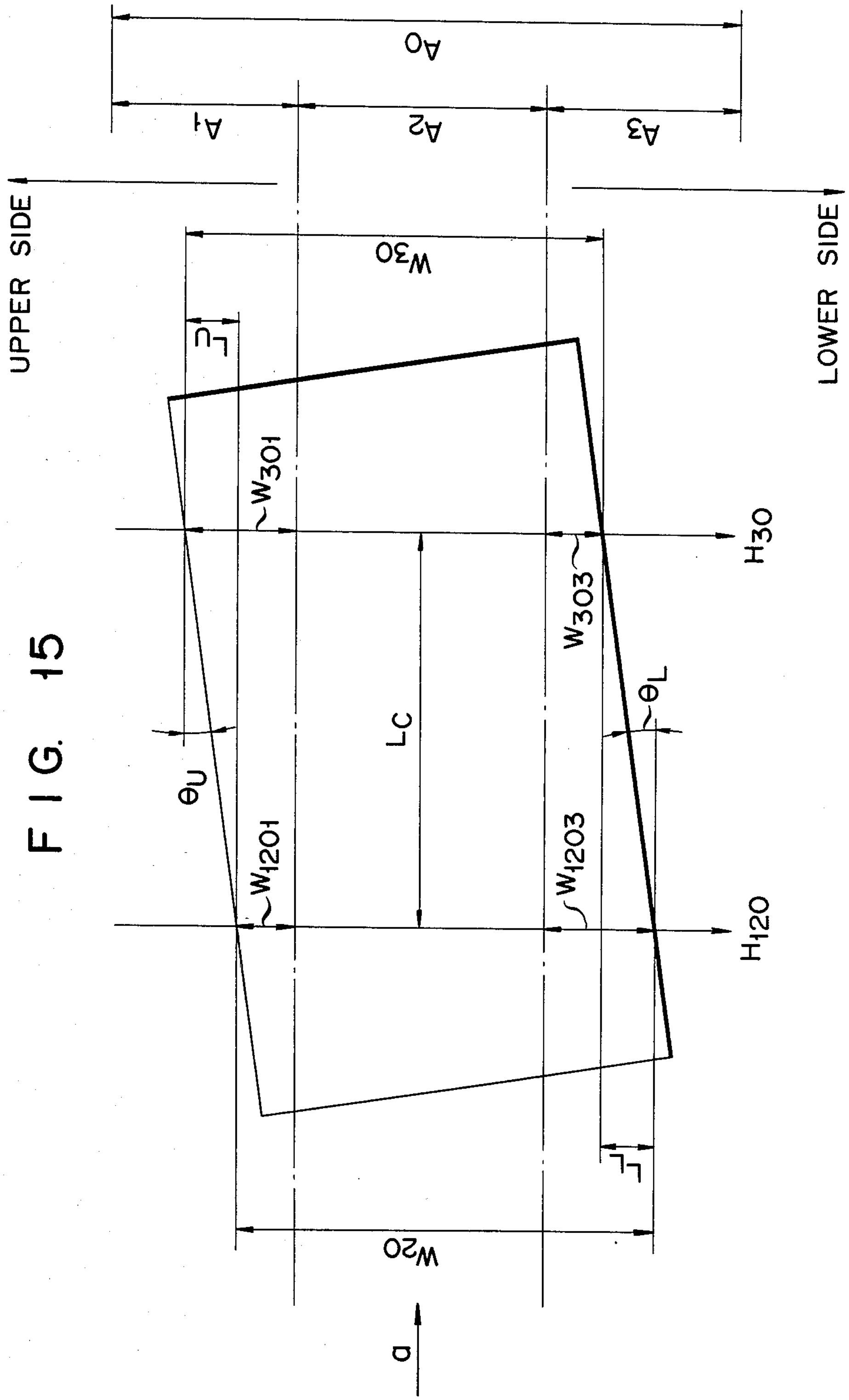
FIG. 15 shows detection of the skew II in detail.

In the embodiment described above, skew detection is performed by obtaining skew distances $L_U$ and $L_L$. However, angles may be used in place of skew distances to perform skew detection. A case will be described with reference to FIGS. 12G and 15 in which skew angles are used in place of skew distances. The flow chart shown in FIG. 12G is substantially the same as that shown in FIG. 12F, except that step 175 is added between steps 161 and 163, and steps 163 to 167 are different. Only these steps of the sequence will be described, and a description of the remaining steps is omitted. In step 175, the values corresponding to the distances $L_U$ and $L_L$ are inserted into equations (9) shown below to obtain an upper skew angle $\theta_U$ and a lower skew angle $\theta_L$:

$$\left.\begin{aligned} \theta_U &= \tan^{-1}(L_U/L_C) \\ \theta_L &= \tan^{-1}(L_L/L_C) \end{aligned}\right\} \quad (9)$$

where $L_C$ is the predetermined distance between the 30th scanning line H30 and the 120th scanning line H120 (FIG. 15). The upper skew angle $\theta_U$ is defined as the upper skew amount, and the lower skew angle 74 $_L$ is defined as the lower skew amount, as shown in FIG. 15. Then, after the upper and lower skew angles $\theta_U$ and $\theta_L$ are obtained, the CPU 63 executes step 163. In step 163, the upper skew angle $\theta_U$ is compared ($\theta_U$:$\theta_L$) with the lower skew angle $\theta_L$. If it is determined that the condition $\theta_U \leqq \theta_L$ is true, the CPU 63 executes step 165 to define the upper skew angle $\theta_U$ as the final skew value $\theta_E$, and the CPU executes step 167. However, if in step 163 it is determined that the condition $\theta_U > \theta_L$ is true, the CPU 169 executes step 169 to define the lower skew angle $\theta_L$ as the final skew value $\theta_E$. Thereafter, the CPU 63 executes step 167. In step 167, the final skew value $\theta_E$ is compared ($\theta_E$:$\theta_R$) with a reference value $\theta_R$ (a preset value to determine whether or not the presence of skew is detected, and, in this case, a preset value of 3°). If it is determined that the condition $\theta_E \geqq \theta_R$ is true, the CPU 63 determines that the sheet is skewed. However, if it is determined that the condition $\theta_E < \theta_R$ is true, the CPU 63 determines that the sheet is not skewed. In the following steps, the same operations as those shown in the flow chart in FIG. 12F are performed. The same effect as the embodiment of the present invention described above can be obtained. Further, since the measured skew values are represented by angles, the values can be visually displayed to signal accurate skew values to the operator.

In the embodiment described above, skew detection is performed by detecting the skew values at the two long sides of the paper sheet P which are perpendicular to the feeding direction. However, the above skew detection need not be performed by obtaining the skew values for both of the two long sides, but may be performed by obtaining a skew value for only one of the two long sides. In the embodiment described above, the detection range of the line sensor is divided into three lengths so as to easily process the measured values in the CPU and to improve measurement precision. However, as needed, the detection lengths may be arbitrarily determined in accordance with the size of the paper sheet or the number of bits of the line sensor. Furthermore, the resolution of the line sensor 35 in the feeding direction and in the scanning direction perpendicular thereto is predetermined to be 1 mm and 0.1 mm, respectively in the preferred embodiment. However, these values can be arbitrarily determined in accordance with the degree of precision of the skew values of the paper sheet to be detected.

Figure 12H:
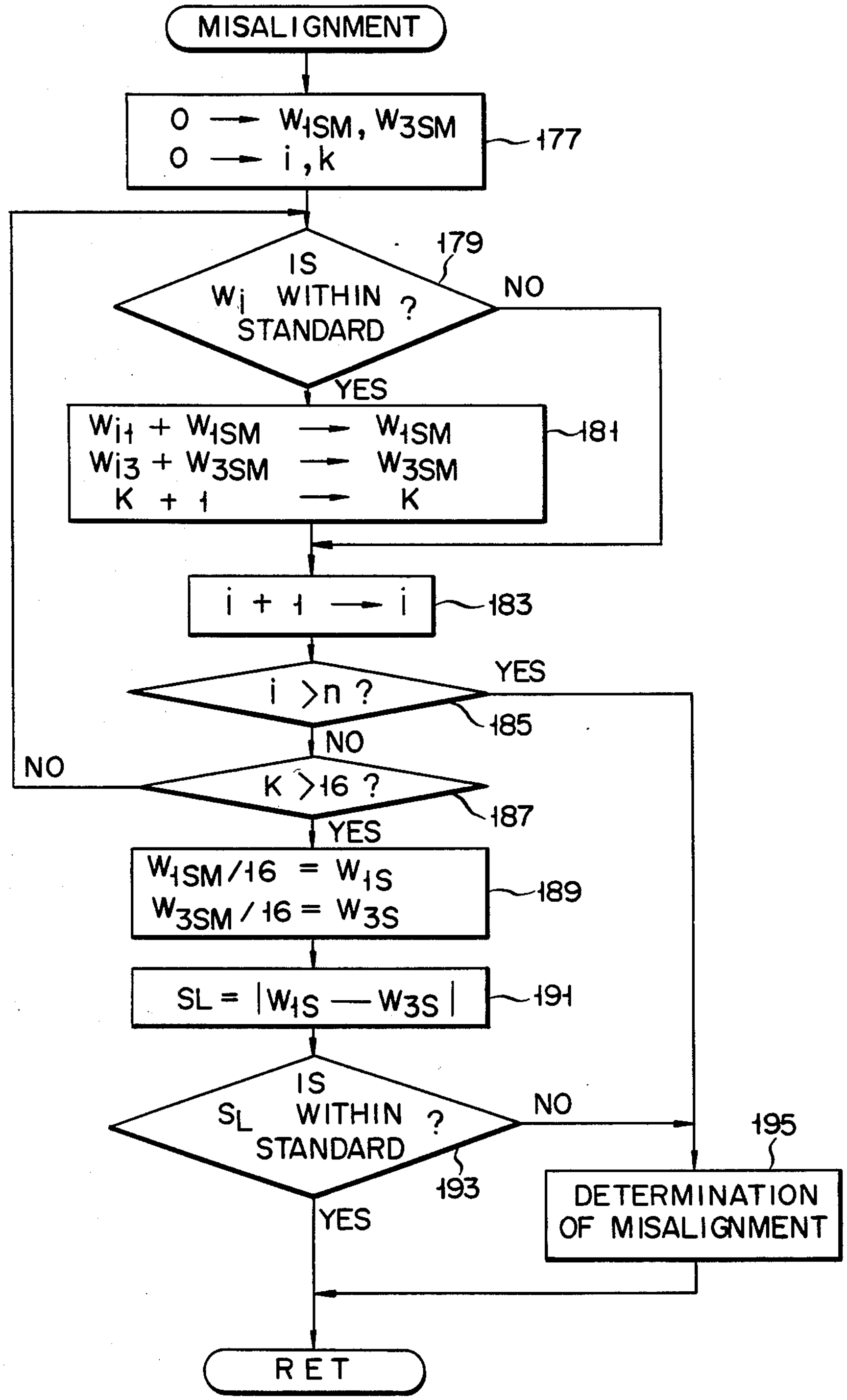

FIG. 12H shows the "misalignment determination" subroutine 103 which will be described in detail hereinafter.

In step 177, the CPU 63 clears total memories $W_{1sm}$ and $W_{3sm}$ for combining 16 pieces of data for each of widths or values $W_{n1}$ and $W_{n3}$, and also clears parameter counters i and k. The CPU 63 then executes step 179. Step 179 checks whether or not the width or value $W_i$ corresponding to the count of the parameter counter i falls within the standard value. If the answer to the decision of step 179 is YES, the CPU executes step 181. In step 181, values or widths $W_{i1}$ and $W_{i3}$ are respectively added to storage contents in the total memories $W_{1sm}$ and $W_{3sm}$. The count of the parameter counter k is also increased by one. Thereafter, the CPU 63 executes step 183. If the answer to the decision of step 179 is NO, the CPU 63 executes step 183. The count of the parameter counter i is increased by one in step 183, and the CPU executes step 185. 185 checks whether or not the parameter i is greater than n, that is, whether all the values $W_{11}, W_{21}, \ldots, W_{n1}$ and $W_{13}, W_{23}, \ldots, W_{n3}$ have been checked. If the answer to the decision of step 185 is NO, then all the values $W_{11}, W_{21}, \ldots, W_{n1}$ and $W_{13}, W_{23}, \ldots, W_{n3}$ have been checked. The CPU 63 then executes step 187.

Step 187 checks whether or not the count of the parameter counter k is greater than 16. If the answer to the decision of step 187 is YES, the number of values $W_i$ which satisfy the standard values is greater than 16. Thus, sufficient data has been accumulated to determine misalignment.

Since data of the total ($=W_{1sM}$) of 16 values $W_{11}$ and data of the total ($=W_{3sM}$) of 16 values $W_{13}$ are stored in the total memories, these total are respectively divided by 16 to obtain mean values $W_{1s}$ and $W_{3s}$ in step 189. Thereafter, the CPU 63 executes step 191. In step 191, an absolute value of a difference between the mean values $W_{1s}$ and $W_{3s}$ is calculated and is defined as a misalignment value $S_L$.

Step 193 determines whether or not the misalignment value $S_L$ falls within the standard value. If the answer to the decision performed by step 193 is YES, the "misalignment determination" subroutine 103 is completed.

The width W obtained in the subroutine shown in FIG. 12C can also be obtained by the following equation;

$$W = C + W_{1s} + W_{3s} \quad (10)$$

Equation (10) indicates a slightly advanced technique for width detection, as compared with the width detection shown in FIG. 12C. The width can thus be detected in the process of misalignment detection.

According to the misalignment detection described above, the paper sheet P currently being fed is scanned n times by the line sensor 35 in the direction perpendicular to the feeding direction. A plurality of widths $W_1$, $W_2$, $W_3$, . . . , $W_n$ are measured in the direction perpendicular to the feeding direction. The values $W_i$ (i=1 to n) numbering k (e.g., 16) which satisfy equation (4) are selected from the measured values $W_1$, $W_2$, $W_3$, . . . , $W_n$. The mean values of the values $W_{i1}$ and $W_{i3}$ are defined as mean values between the right and left edges of the paper sheet P. Thus, proper misalignment detection can be performed even if the paper sheet P has a dog ear or a damaged portion and, further, even if the paper sheet P varies in thickness and is dirty. Furthermore, the detection range of the line sensor 35 is divided into a plurality of lengths (ranges), and the pieces of data which correspond to the lengths $WW_1$ and $WW_3$ obtained from these lengths are computed in a predetermined manner so as to measure the values $W_1$, $W_2$, $W_3$, . . . $W_n$. Therefore, highly precise measured values can be obtained, and hence, highly precise detection can be performed.

Figure 12I:
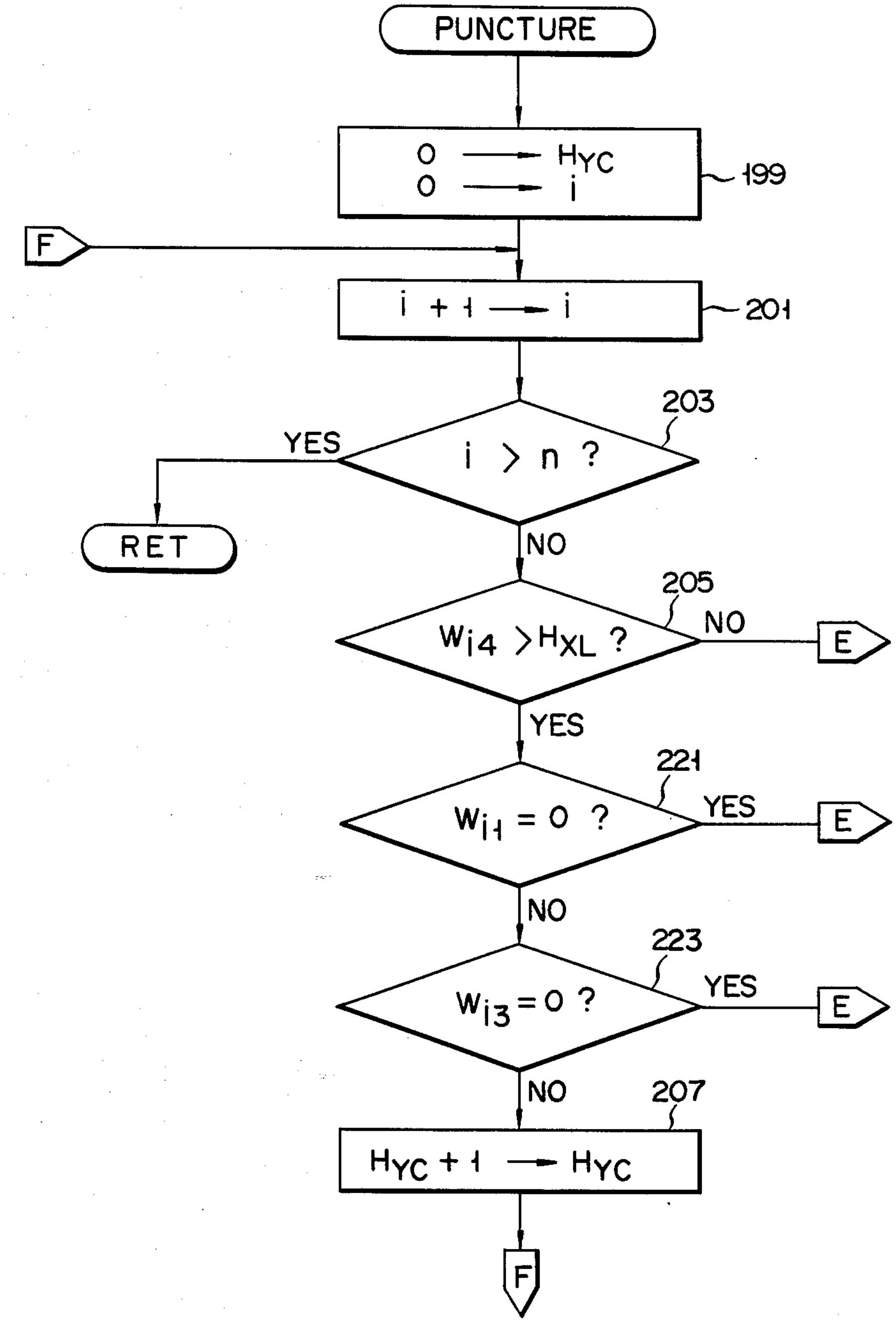
FIGS. 12I and 12J show a subroutine "puncture determination"
Figure 12J:
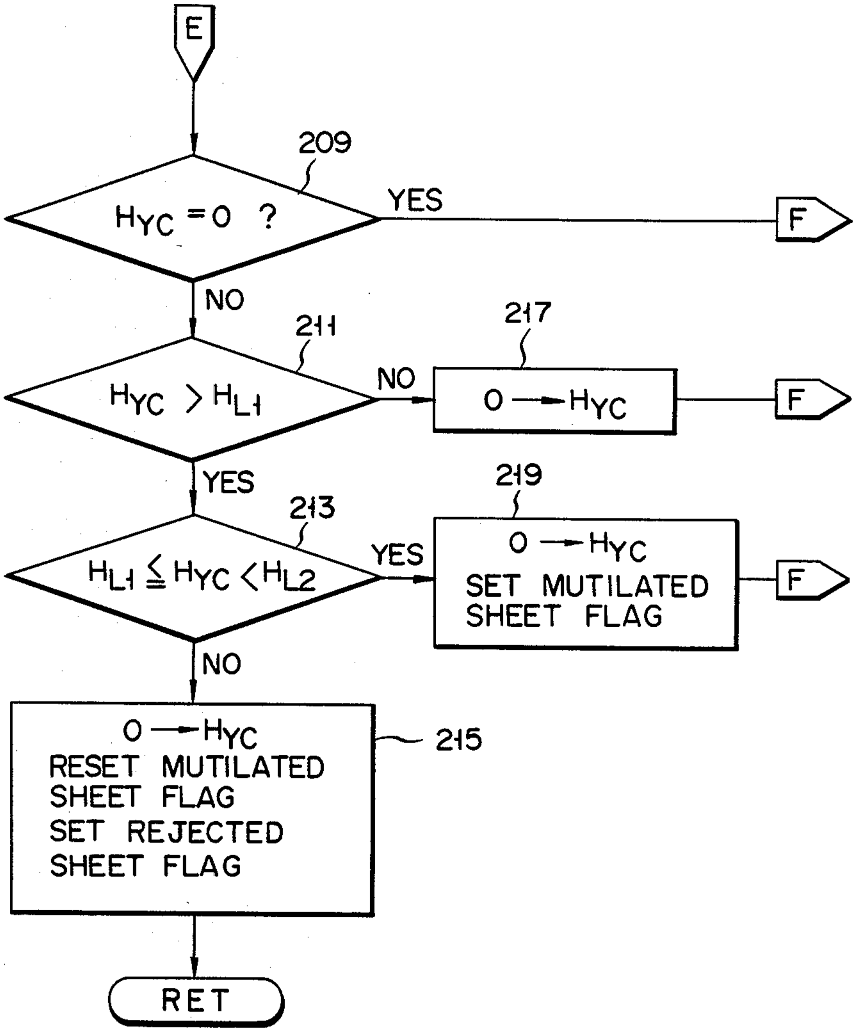

FIGS. 12I and 12J show the "puncture determination" subroutine 105 for detecting the presence of a puncture or hole, which will now be described in detail.

The count of a scan counter i and the count of a feeding direction counter $H_{YC}$ are cleared in step 199. The value stored by the feeding direction counter is increased (incremented) when an amount $W_4$ of light passing through the puncture or hole is higher than an allowable reference level $H_{XL}$. The CPU then executes step 201. The count of the scan counter i is incremented by 1, and the CPU 63 executes step 203. The CPU 63 checks in step 203 whether or not the number n of scans (predetermined for the puncture check) is greater than the count of the counter i. If it is determined that the condition $i>n$ is true, all the values have checked and the subroutine is ended. If not, in step 205, if it is determined that the condition $W_{i4}>H_{XL}$ is true, a puncture or hole is determined to be present in the paper sheet P. The CPU 63 then executes steps 221 and 223 to be described later and further executes step 207. In step 207, the count of the counter $H_{YC}$ is increased by one. The CPU 63 then re-executes step 201 to check the next scanning line.

However, when the condition $W_{i4} \leqq HXL$ is true, it is determined that no puncture or hole is present in the paper sheet P. The CPU 63 then executes step 209 to check the previous determination of the presence or absence of a puncture, or whether the puncture or hole has been determined to be not present.

If the decision performed by step 209 is answered YES, or if the condition $H_{YC}=0$ is established, any puncture or hole continues to the scanning line currently being checked, so that the CPU 63 re-executes step 201. In step 201, the CPU 63 checks the next scanning line.

However, if the answer to the decision of step 209 is NO, or if the condition $H_{YC} \neq 0$ is true, the puncture or hole is present immediately before the scanning line currently being checked. Therefore, in step 211, the CPU 63 checks the count of the counter $H_{YC}$.

In step 211, the count of the counter $H_{YC}$ is compared with a first level $H_{L1}$ for puncture determination. If it is determined that the condition $H_{YC}<H_{L1}$ is true, a puncture or hole is present in the X direction and is continuously formed in the Y direction. The size of the puncture is within an allowable range, so that the CPU 63 determines that no puncture present. The CPU 63 then executes step 217 which clears the counter $H_{YC}$. The CPU 63 then re-executes step 201 to check the next scanning line. However, if it is determined in step 211 that the condition $H_{YC} \geqq H_{L1}$ is true, the count of the counter $H_{YC}$ is compared with a second level $H_{L2}$ for puncture determination in step 213.

In step 213, if it is determined that the condition $H_{L1} \leqq H_{YC} \leqq H_{L2}$ is true, the counter $H_{YC}$ is cleared. Then, a "mutilated sheet" flag is set to determine a nonusable banknote when the banknote inspection apparatus is used. However, it is not certain at this stage if all the required areas of the paper sheet P have been checked. A large puncture or hole may yet be present to satisfy the condition $H_{YC}>H_{L2}$. Therefore, the CPU 63 re-executes step 201 to check the next scanning line. However, if it is determined that the condition $H_{YC}>H_{L2}$ is true, the counter $H_{YC}$ is cleared. Furthermore, if the mutilated sheet flag is set, a rejected sheet flag is also set. In this case, the presence of a puncture need not be checked further and the subroutine "puncture determination" is ended. The above-mentioned series of operations allows highly precise puncture detection.

Figure 16A:
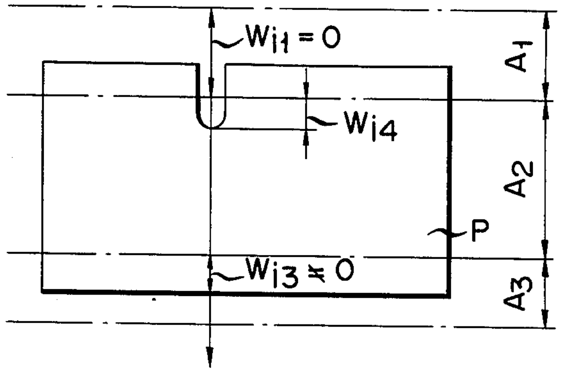
FIG. 16A and 16B show discrimination of a damaged banknote and a banknote with a puncture.
Figure 16B:
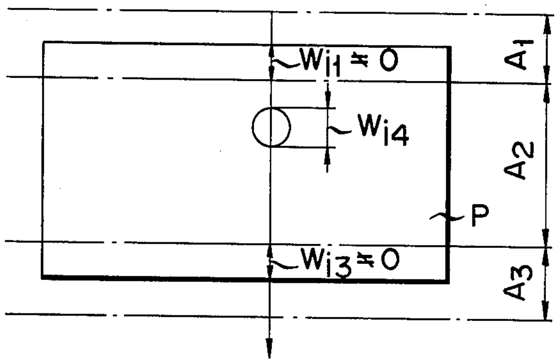

FIGS. 16A and 16B demonstrate the distinction between a banknote having a damaged portion and a banknote having a puncture. When a damaged banknote is checked, the levels of the line sensor change in a sequence of light, dark and light. However, when a banknote having a puncture is checked, at least one of the scanning lines indicates a sequence of dark, light and dark. CPU 63 executes steps 221 and 223 to distinguish a puncture from a damaged portion. When the presence of a puncture of the size or length $W_{i4}$ is detected in step 205, as shown in FIG. 12I, and when lengths $W_{i1}$ and $W_{i3}$ are not 0 respectively in steps 221 and 223, the levels change in the sequence of dark, light and dark. Thus, a puncture is determined to exist. In steps 221 and 223, if only one of the lengths $W_{i1}$ and $W_{i3}$ is 0, the CPU 63 determines that only a damaged portion is present in the paper sheet.

Figure 17:
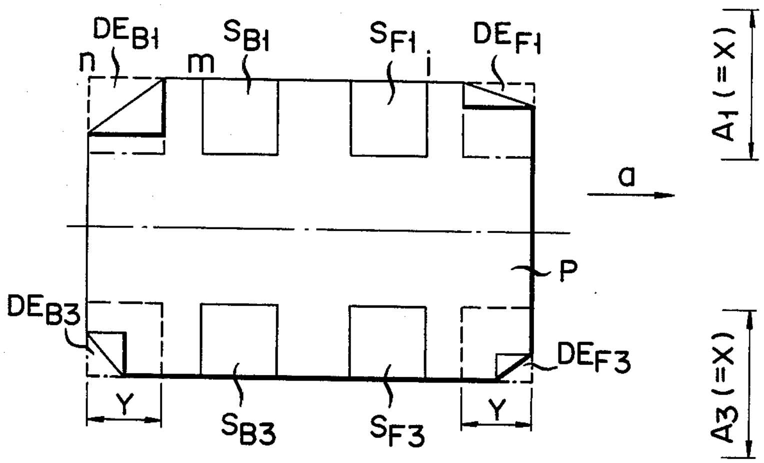
FIG. 17 shows dog ear detection in detail.

FIG. 17 demonstrates a dog ear or bent edge determination system in detail. The detection lengths (ranges) used for detecting the dog ears number four in the preferred embodiment, as shown in FIG. 17. These detection lengths are indicated by lengths X and Y, respectively, in the directions perpendicular and parallel to the feeding direction. The length X corresponds to the first and third lengths A1 and A3. Widths adjacent to the dog ear detection areas are obtained by equation (3). If the measured widths fall within the allowable range, the obtained values $W_{i1}$, $W_{i3}$, $W_{m1}$ and $W_{m3}$ are stored in the memory. However, if the measured widths do not fall within this range, that is, if the widths are short due to the presence of a damaged portion or puncture, these values are not stored. When the resolution of the line sensor in the feeding direction is 1 mm, Y=16 mm. A standard area $S_{F1}$ is selected in a portion spaced apart from the leading edge of the paper sheet P by the length Y (i=20 mm in FIG. 17). Only when widths measured from the position spaced apart from the leading edge of the paper sheet by 20 mm fall within the allowance, 16 values of widths of the 16 scanning lines are added. The sum is used to measure the standard area $S_{F1}$. A standard area $S_{F3}$ is also obtained in the same manner as described above. A standard area $S_{B1}$ is obtained in the following manner: if widths measured from the position (corresponding to the nth scanning line $H_n$) spaced apart from the trailing edge of the paper sheet by 20 mm fall within the allowable range, 16 values of widths of the 16 scanning lines are added to obtain a sum which is used to obtain the standard area $S_{B1}$. A standard area $S_{B3}$ is obtained in the same manner as described above. Referring to FIG. 11, if the leading and trailing edges of the paper sheet are defined to correspond to $H_l$ and $H_n$, respectively, dog ear amounts $DE_{F1}$, $DE_{F3}$, $DE_{B1}$ and $DE_{B3}$ are given by following equations:

$$\left.\begin{aligned} DE_{F1} &= S_{F1} - \sum_{i=1}^{i=16} W_{i1} \\ DE_{F3} &= S_{F3} - \sum_{i=1}^{i=16} W_{i3} \\ DE_{B1} &= S_{B1} - \sum_{i=n-16}^{i=n} W_{i1} \\ DE_{B3} &= S_{B3} - \sum_{i=n-16}^{i=n} W_{i3} \end{aligned}\right\} \quad (11)$$

Figure 18A:
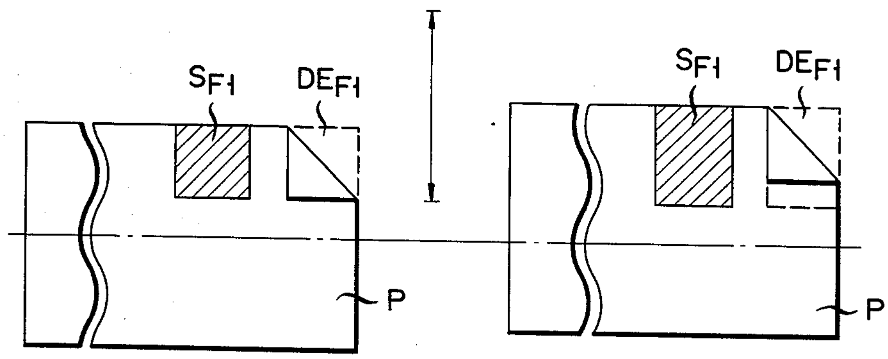
FIGS. 18A and 18B show a dog ear detection area.
Figure 18B:
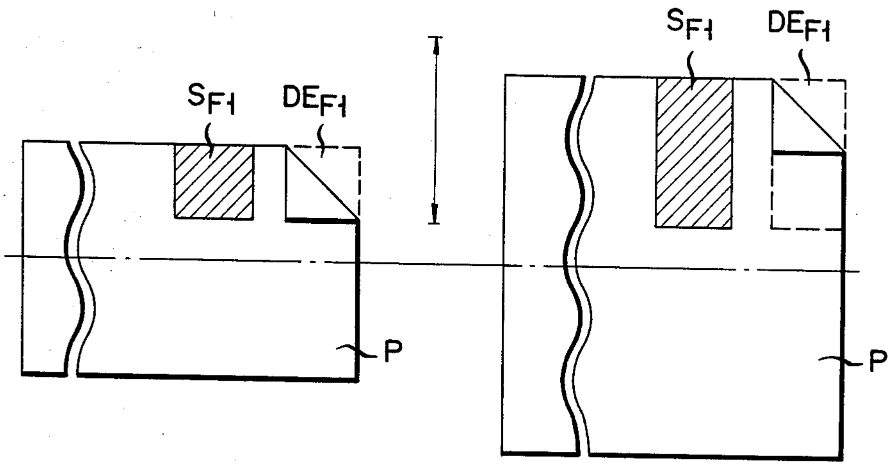

Thus, obtained dog ear amounts $DE_{F1}$, $DE_{F3}$, $DE_{B1}$, and $DE_{B3}$ are compared with the dog ear determination level. If the amounts do not fall within the allowance, these values are rejected. FIGS. 18A and 18B are views showing dog ear detection areas. FIG. 18A shows a case in which even if the paper sheet P is misaligned to the right, the determination of dog ear amount $DE_{F1}$ may not be adversely affected by such misalignment and may not be changed. FIG. 18B shows a case in which a large paper sheet (right) and a small paper sheet (left) are used. The dog ear amounts of these paper sheets are the same. As a result, highly precise dog ear detection can be provided.

What is claimed is:

1. An apparatus for detecting the dimensions of a paper sheet comprising:

conveyance means for conveying sheets of paper in a feeding direction along a predetermined conveyance path;

light source means, disposed on a first side of the conveyance path, for directing light toward a paper sheet conveyed along said conveyance path by said conveying means;

light receiving means, disposed on a second side of the conveyance path opposing said source means, for receiving light emitted from the light source means which passes across said path;

line sensing means, optically coupled to said light receiving means, for selectively scanning a line perpendicular to the feeding direction of said conveyed sheet, said line including at least first and second distinct view field regions separated from one another by the center of said path, and for producing a pair of distance values indicating the distances opposing edges of a conveyed sheet project into said first and second regions, respectively; and digital signal processing means for controlling the line sensing means to scan a prescribed plurality of times along said line as said sheet is conveyed along said path to thereby produce a sequence of pairs of said distance values, for summing each of said pairs of values in said sequence with a predetermined constant value to produce a sequence of width values $W_1, W_2, W_3 \ldots W_n$ representing the width of said conveyed paper sheet at a corresponding plurality of positions along said sheet, for selecting the width values $W_i$ from said sequence (i=1 through n) falling within the range $W_s - \Delta W \leqq W_i \leqq W_s + \Delta W$, where $W_s$ denotes a nominal width value of said paper sheet and $\Delta W$ denotes an allowable deviation of the width of said paper sheet from said nominal value $W_s$, for computing the average width value of said sheet from said selected with value, and for comparing said average width value with a reference width value, said average width value indicating the overall width of the paper sheet.

2. An apparatus according to claim 1 wherein said processing means excludes any width value $W_i$ which does not fall within said predetermined allowable range from the computation of said average width value.

3. An apparatus according to claim 1 further comprising means for storing said sequence of width values.

4. An apparatus according to claim 3 wherein said processing means compares the width values stored in said storing means to determine if each is included in said predetermined allowable range and judges that said sheet is damaged when a predetermined number of consecutive sequential width values are smaller than a lower limit of the allowable range.

5. An apparatus according to claim 3 wherein:

said line sensing means also senses a difference in the light transmittance across said path between the first and second regions; and said processing means determines the magnitude of said difference for the scans corresponding to width values falling within the allowable range stored in the storing means, determines indicia of misalignment from said determined differences, compares the indicia of misalignment with a reference value, and indicates said conveyed sheet is misaligned when said difference exceeds said reference value.

6. An apparatus according to claim 5 wherein said processing means controls said line sensing means to scan said line a plurality of times to produce a corresponding plurality of values, and produces an indication of misalignment in response to the average of said plural values produced by said plural scans with respect to the difference in the light transmittance between the first and second regions.

7. An apparatus according to claim 3 wherein said processing means also selects two width values $W_x$, $W_y$ from said stored sequence of width values, said two widths indicating the width of said sheet at points on said sheet spaced apart from one another in said feeding direction and which fall within the allowable range, determines whether the measured values $W_x$, $W_y$ meet the following conditions:

$$W_s - \Delta W \leqq W_x \leqq W_s + \Delta W$$

and $$W_s - \Delta W \leqq W_y \leqq W_s + \Delta W,$$

where $W_s$ denotes the nominal width value of the paper sheet and $\Delta W$ denotes the maximum allowable deviation therefrom, and, only when said conditions are met, determines at least one skew value from the difference in the light transmittance between the first and second regions, compares said skew value with a skew reference value, and determines the occurrence of skew in response to said comparison.

8. An apparatus according to claim 7 wherein said processing means determines a first skew value from the light transmittance in the first region, determines a second skew value from the light transmittance in the second region, compares the smaller one of the first and second skew values with a reference value, and determines the occurrence of skew in response to said comparison.

9. An apparatus according to claim 7 wherein said processing means determines the skew value in response to the distance of skew.

10. An apparatus according to claim 7 wherein said processing means determines the skew value in response to the angle of skew.

11. An apparatus according to claim 8 wherein said processing means determines the first and second skew values in response to the distance of skew.

12. An apparatus according to claim 8 wherein said processing means determines the first and second skew values in response to the angle of skew.

13. An apparatus according to claim 3 wherein said processing means also determines the difference between the sum of the light transmittances detected by said line sensing means for a first prescribed number of scans of said line covering a corner portion of the conveyed paper sheet and the sum of the light transmittances for a second prescribed number of scans of said line covering a portion of said sheet adjacent to said corner portion thereof, said second number of scans each producing a value indicating a width falling within an allowable range, for comparing the difference with a reference value, and for determining the occurrence of dog ear of said sheet in response to said comparison.

14. An apparatus according to claim 1 wherein:
- said line is divided into three distinct view field regions;
- said light source means projects light onto all three regions; and
- the processing means determines the occurrence of a puncture in said sheet when said line sensing means senses that light is transmitted through a central of said three regions for a prescribed number of consecutive scans.

15. An apparatus according to claim 14 wherein said processing means determines a value of the length of a detected puncture, compares the length value of said detected puncture in the paper sheet feeding direction with first and second predetermined threshold values, judges that the paper sheet does not have a puncture when said length value is smaller than the first threshold value, judges that the paper sheet has a puncture when said length value falls between said first and second threshold values, and judges that the paper sheet should be discarded when said length value is greater than the second threshold value.

16. A method for detecting the dimensions of a papr sheet, comprising the steps of:
- conveying at least one sheet of paper in a feeding direction along a conveyance path;
- directing light toward said sheet being conveyed;
- optically scanning the light directed toward said sheet by said directing step which passes across said path along a line perpendicular to the feeding direction of said conveyed sheet, said line including at least first and second distinct view field regions separated from one another by the center of said path;
- producing, for said scan, a value of the dimension a conveyed sheet projects into each of said first and second regions;
- repeating said scanning and producing steps a plurality of times as said sheet is conveyed along said path by said conveying step;
- summing, for each said scan, the values obtained for said at least first and second regions with a predetermined constant value to produce a sequence of width values $W_1, W_2, W_3 \ldots W_n$ representing the widths of said conveyed paper sheet at a corresponding plurality of longitudinal positions along said sheet;
- selecting the width values $W_i$ from said sequence (i=1 through n) falling within the range $W_s-\Delta W \leqq W_i \leqq W_s+\Delta W$, where $W_s$ is a predetermined nominal width value of said paper sheet and $\Delta W$ is a present allowable deviation of the width of said paper sheet from said nominal width value $W_s$;
- computing the average width value of said sheet from said selected values; and
- comparing said average width value with a reference width value.

17. A method as in claim 16 wherein said selecting step excludes any width value Wi produced by said summing step which does not fall within said predetermined allowable range.

18. A method as in claim 16 further comprising the step of storing said sequence of width values produced by said summing step.

19. A method as in claim 17 further including the step of judging said paper sheet is damaged when a predetermined number of said consecutive sequential width values are smaller than the lower limit of said allowable range.

20. A method as in claim 17 wherein:
- said scanning step includes the step of sensing a difference in the light transmittance across said path between the first and second regions; and
- said method further includes the steps of:
  - determining the difference between the dimension of said sheet in said first region and the dimension of said sheet in second region in response to said sensed differences in light transmittance for the values indicating widths falling within the allowable range,
  - determining indicia of misalignment from said determined differences in dimension,
  - comparing the indicia of misalignment with a reference value, and
  - judging said conveyed sheet is misaligned when said difference exceeds said reference value.

21. A method as in claim 20 wherein said misalignment judging step includes the step of producing an indication of misalignment in response to the average of said plural values produced by said plural scans of said scanning step with respect to the difference in the light transmittance between the first and second regions.

22. A method as in claim 18 further including the steps of:
- selecting two width values Wx, Wy from said stored sequence of width values, said two width values corresponding to the widths of said sheet at two points on said sheet spaced apart from one another in said feeding direction which fall within the allowable range;

determining whether the values $W_x$, $W_y$ meet the conditions $$W_s-\Delta W \leqq W_x \leqq W_s+\Delta W$$

and $$W_s-\Delta W \leqq W_y \leqq W_s+\Delta W$$

where Ws denotes the nominal width value of the paper sheet and $\Delta W$ denotes a maximum allowable deviation therefrom; and only when both said conditions are met, performing the following steps:

(a) determining at least one skew value from the difference in the light transmittance between the first and second regions for the scans from which said width values $W_x$, $W_y$ were obtained, (b) comparing said skew value with a skew reference value, and (c) determining the occurrence of skew in response to the comparison of said comparing step (b).

23. A method as in claim 22 wherein:

said skew value determining step (a) includes the steps of determining a first skew value from the light transmittance in the first region, and determining a second skew value from the light transmittance in the second region;

said comparing step (b) includes the step of comparing the smaller one of the first and second skew values with a reference value; and said skew occurrence determining step (c) judges a conveyed sheet is skewed in response to said comparison of said comparing step (b).

24. A method as in claim 23 wherein said skew judging step judges said sheet is skewed in response to the distance of skew of said sheet from a predetermined orientation.

25. A method as in claim 23 wherein said skew judging step judges said sheet is skewed in response to the angle of skew of said sheet from a predetermined orientation.

26. A method as in claim 22 wherein said skew judging step judges said sheet is skewed in response to the distance of skew of said sheet from a predetermined orientation.

27. A method as in claim 22 wherein said skew judging step judges said sheet is skewed in response to the angle of skew of said sheet from a predetermined orientation.

28. A method as in claim 18 wherein:

said scanning step includes the step of sensing a difference in the light transmittance across said path between the first and second regions; and said method further includes the steps of:

determining the difference between the sum of light transmittance detected by said scanning step for a first prescribed number of scans of said line covering a corner portion of the conveyed sheet and the sum of the light transmittance for a second prescribed plurality of scans of said line covering a portion of said sheet adjacent to said corner portion and each plurality of scans each producing a value indicating a width falling within said allowable range;

comparing the difference with a reference value; and determining the occurrence of dog ear of said sheet in response to said comparison.

29. A method as in claim 16 wherein:

said scanning line is divided into three distinct view field regions;

said light directing step directs light onto all three of said regions; and said method further includes the steps of:

(a) sensing if light is transmitted through a central of said three regions consecutively over a prescribed number of consecutive scans, and (b) judging the occurrence of a puncture in said sheet in response to said sensing step (a).

30. A method as in claim 29 further comprising the steps of:

determining a value representing the length of a detected puncture in the feeding direction;

comparing the determined puncture length value with first and second predetermined threshold values;

judging the paper sheet does not have a puncture when said determined length value is smaller than said first threshold value;

judging that the paper sheet has a puncture when said determined length value is within the range between said first and second threshold values; and judging that the paper sheet should be discarded when said determined length value is greater than said second threshold value.

31. A method for detecting the dimensions of an optically opaque sheet comprising the steps of:

(1) conveying an opaque sheet in a feeding direction along a conveyance path;

(2) directing light from a first side of said conveyance path toward said path and onto said sheet being conveyed by said conveying step (1);

(3) sensing the light which passes through said path to a second side of said path opposite said first side and which falls upon a line fixedly oriented with respect to said path perpendicular to said feeding direction and substantially parallel to said sheet being conveyed;

(4) producing values representing the lengths $WW_1$ and $WW_3$ of portions of first and second discrete segments of said line which are illuminated by said sensed light, said first and second segments being spaced apart by a predetermined space $WW_2$, the center of said sheet being included in said space $WW_2$.

(5) storing the length values produced by said detecting step (4);

(6) repeating steps (3)–(5) a plurality n times as said sheet is conveyed by said conveying step (1) to thereby produce values measure representing said lengths WW1 and WW3 at a plurality of longitudinal positions 1–n along said sheet;

(7) calculating the values representing the widths from $W_1$ to $W_n$ of said sheet at said plurality of longitudinal positions from 1 to n from the values stored by said storing step (5);

(8) selecting, from said values representing widths from $W_1$ to $W_n$ calculated by said calculating step (7), those values which fall within a predetermined range about a predetermined nominal expected width value of said sheet; and (9) calculating the average of the width values selected by said selecting step (9).

* * * * *